(12) United States Patent
Kim et al.

(10) Patent No.: US 12,438,561 B2
(45) Date of Patent: Oct. 7, 2025

(54) RFFE DEVICE, ELECTRONIC DEVICE AND METHOD FOR OPERATING THE SAME

(71) Applicant: Samsung Electronics Co., Ltd., Suwon-si (KR)

(72) Inventors: Seonjun Kim, Suwon-si (KR); Yohan Moon, Suwon-si (KR); Dongil Yang, Suwon-si (KR); Jonghun Yoo, Suwon-si (KR); Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 489 days.

(21) Appl. No.: 17/941,344

(22) Filed: Sep. 9, 2022

(65) Prior Publication Data

US 2023/0072367 A1    Mar. 9, 2023

Related U.S. Application Data

(63) Continuation of application No. PCT/KR2022/013523, filed on Sep. 8, 2022.

(30) Foreign Application Priority Data

Sep. 8, 2021  (KR) .................. 10-2021-0119774

(51) Int. Cl.
*H04B 1/00* (2006.01)
*H04B 1/40* (2015.01)

(52) U.S. Cl.
CPC ............. *H04B 1/0057* (2013.01); *H04B 1/40* (2013.01)

(58) Field of Classification Search
CPC .................................. H04B 1/0057; H04B 1/40
See application file for complete search history.

(56) References Cited

U.S. PATENT DOCUMENTS 10,454,511 B2   10/2019 Wilhelm et al.
11,075,666 B2    7/2021 Liu et al.
(Continued)

FOREIGN PATENT DOCUMENTS

JP    2021-016049    2/2021
KR    10-2011-0120668    11/2011
(Continued)

OTHER PUBLICATIONS

Search Report dated Dec. 28, 2022 in International Patent Application No. PCT/KR2022/013523.
(Continued)

*Primary Examiner* — Md K Talukder
(74) *Attorney, Agent, or Firm* — Nixon & Vanderhye, P.C.

(57) ABSTRACT

According to various embodiments, there may be provided a radio frequency front end (RFFE) device comprising: a plurality of ports each connectable to an antenna, a first circuit configured to process a first signal for a first operating frequency band included in a first frequency band group, a second circuit configured to process a second signal for a second operating frequency band included in a second frequency band group, a diplexer including a first end electrically connected with a first port of the plurality of ports, a second end, and a third end, a first switch connected to a first conductive line connecting the first circuit and a second port of the plurality of ports and electrically connecting or electrically separating the second end of the diplexer to/from the first circuit and the second port based on a state, and a second switch connected to a second conductive line connecting the second circuit and a third port of the plurality of ports and electrically connecting or electrically separating the third end of the diplexer to/from the second circuit and the third port based on a state.

20 Claims, 15 Drawing Sheets

(56) References Cited

U.S. PATENT DOCUMENTS

| | | | |
|---|---|---|---|
| 2005/0227631 A1* | 10/2005 | Robinett | H04B 1/006 455/168.1 |
| 2012/0009887 A1 | 1/2012 | Sanguinetti et al. | |
| 2014/0003300 A1 | 1/2014 | Weissman et al. | |
| 2015/0018043 A1* | 1/2015 | Taniuchi | H04B 1/006 333/101 |
| 2016/0164547 A1* | 6/2016 | Kim | H04B 1/403 455/266 |
| 2016/0285501 A1 | 9/2016 | Jeong et al. | |
| 2017/0012599 A1 | 1/2017 | Iwanaga | |
| 2017/0163293 A1* | 6/2017 | Lee | H04L 67/12 |
| 2018/0063031 A1 | 3/2018 | Wloczysiak et al. | |
| 2018/0145707 A1 | 5/2018 | Cheon et al. | |
| 2018/0152955 A1 | 5/2018 | Park et al. | |
| 2018/0359077 A1 | 12/2018 | Haine et al. | |
| 2019/0347534 A1 | 11/2019 | Yim | |
| 2020/0244408 A1 | 7/2020 | Kim et al. | |
| 2021/0013910 A1 | 1/2021 | Ono et al. | |

FOREIGN PATENT DOCUMENTS

| | | |
|---|---|---|
| KR | 10-2013-0043149 | 4/2013 |
| KR | 10-2016-0115003 | 10/2016 |
| KR | 10-2016-0129062 | 11/2016 |
| KR | 10-2018-0056234 | 5/2018 |
| KR | 10-2018-0062286 | 6/2018 |
| KR | 10-2019-0017122 | 2/2019 |
| KR | 10-2019-0129630 | 11/2019 |

OTHER PUBLICATIONS

Written Opinion dated Dec. 28, 2022 in International Patent Application No. PCT/KR2022/013523.

* cited by examiner

RFFE DEVICE, ELECTRONIC DEVICE AND METHOD FOR OPERATING THE SAME

CROSS-REFERENCE TO RELATED APPLICATIONS

This application is a continuation of International Application No. PCT/KR2022/013523 designating the United States, filed on Sep. 8, 2022, in the Korean Intellectual Property Receiving Office and claiming priority to Korean Patent Application No. 10-2021-0119774, filed Sep. 8, 2021, in the Korean Intellectual Property Office, the disclosures of which are incorporated by reference herein in their entireties.

BACKGROUND

Field

The disclosure relates to a radio frequency front-end (RFFE) device, an electronic device, and a method for operating the same.

Description of Related Art

As mobile communication technology evolves, multi-functional portable terminals are commonplace and, to meet increasing demand for radio traffic, vigorous efforts are underway to develop 5G communication systems. To achieve a higher data transmission rate, 5G communication systems are being implemented on higher frequency bands (e.g., a band of 25 GHz to 60 GHz) as well as those used for 3G communication systems and long-term evolution (LTE) communication systems.

For example, to mitigate pathloss on the mmWave band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

To transmit a signal from an electronic device to a communication network (e.g., a base station), data generated from a processor or a communication processor in the electronic device may be signal-processed through a radio frequency integrated circuit (RFIC) and radio frequency front-end (RFFE) circuit and then transmitted to the outside of the electronic device through at least one antenna.

An electronic device may include an antenna having a structure for transmitting and/or receiving signals of a single frequency band group (hereinafter, a separated structure) and/or an antenna having a structure for transmitting and/or receiving signals of a plurality of frequency band groups (hereinafter, a common structure). The antenna having the common structure may be used in a communication environment that requires signals of different frequency band groups, such as EN-DC. The electronic device may include different RFFE devices for each type of antenna (e.g., an antenna having a separated structure and an antenna having a common structure). For example, an RFFE device connected to the antenna having the common structure may further include a diplexer for multiplexing signals of a plurality of frequency band groups, as compared to an RFFE device connected to the antenna having the separated structure. However, as different RFFE devices for each antenna are assembled in the electronic device, the internal design of the electronic device may be complicated. As a result, the assembly process may be overburdened, and the durability of the electronic device may be degraded.

SUMMARY

According to various embodiments, an RFFE device may include circuits implemented to process signals of a plurality of frequency band groups, a diplexer, and switches corresponding to the ends of the diplexer to be used regardless of the type of antennas (e.g., the antenna having the separated structure and the antenna having the common structure). Therefore, the assembly process for the RFFE device may be facilitated.

According to various embodiments, when the RFFE device is connected to the antenna having the common structure, the electronic device further may include matching circuits connected to the RFFE device, outside the RFFE device, thereby ensuring communication performance.

According to various embodiments, an electronic device and a method for controlling the same may control the state of a plurality of switches connected to a diplexer of an RFFE device according to the type of the antenna connected to the RFFE device, thereby making the RFFE device available regardless of the type of the antenna.

According to various embodiments, there may be provided a radio frequency front end (RFFE) device comprising: a plurality of ports each connectable to an antenna, a first circuit configured to process a first signal for a first operating frequency band included in a first frequency band group, a second circuit configured to process a second signal for a second operating frequency band included in a second frequency band group, a diplexer including a first end electrically connected with a first port of the plurality of ports, a second end, and a third end, a first switch connected to a first conductive line connecting the first circuit and a second port of the plurality of ports and electrically connecting or electrically separating the second end of the diplexer to/from the first circuit and the second port based on a state, and a second switch connected to a second conductive line connecting the second circuit and a third port of the plurality of ports and electrically connecting or electrically separating the third end of the diplexer to/from the second circuit and the third port based on a state.

According to various embodiments, there may be provided an electronic device comprising: a first antenna configured to transmit and/or receive a signal for a first operating frequency band and a second operating frequency band, a radio frequency front end (RFFE) device including a first port connected to the first antenna, a second port, a third port, a first circuit configured to process a first signal for the first operating frequency band, a second circuit configured to process a second signal for the second operating frequency band, a diplexer including a first end electrically connected with the first port, a second end, and a third end, a first switch connected to a first conductive line connecting the first circuit and the second port and electrically connecting or electrically separating the second end of the diplexer to/from the first circuit and the second port based on a state, and a second switch connected to a second conductive line connecting the second circuit and the third port and electrically connecting or electrically separating the third end of the diplexer to/from the second circuit and the third port based on a state, a first matching circuit connected to the second port, and a second matching circuit connected to the third port.

According to various embodiments, there may be provided an electronic device comprising: a first antenna configured to transmit and/or receive a first signal having a first operating frequency band included in a first frequency band group, a second antenna configured to transmit and/or receive a second signal having a second operating frequency band included in a second frequency band group, and an RFFE device including a first port, a second port connected with the first antenna, a third port connected with the second antenna, a first circuit associated with the first signal, a second circuit associated with the second signal, a diplexer including a first end electrically connected with the first port, a second end, and a third end, a first switch connected to a first conductive line connecting the first circuit and the second port and electrically connecting or electrically separating the second end of the diplexer to/from the first circuit and the second port based on a state, and a second switch connected to a second conductive line connecting the second circuit and the third port and electrically connecting or electrically separating the third end of the diplexer to/from the second circuit and the third port based on a state.

Embodiments of the disclosure are not limited to the foregoing objectives, and other objectives would readily be appreciated by a skilled artisan from the following detailed description taken in conjunction with the accompanying drawings.

According to various embodiments, there may be provided an RFFE device that includes circuits implemented to process signals of a plurality of frequency band groups, a diplexer, and switches corresponding to the ends of the diplexer to be used regardless of the type of antennas (e.g., the antenna having the separated structure and the antenna having the common structure) and facilitates the assembly process for the RFFE device.

According to various embodiments, there may be provided an electronic device that, when the RFFE device is connected to the antenna having the common structure, further includes matching circuits connected to the RFFE device, outside the RFFE device, thereby ensuring communication performance.

According to various embodiments, there may be provided an electronic device and a method for controlling the same that may control the state of a plurality of switches connected to a diplexer of an RFFE device according to the type of the antenna connected to the RFFE device, thereby making the RFFE device available regardless of the type of the antenna.

DETAILED DESCRIPTION

Figure 1:
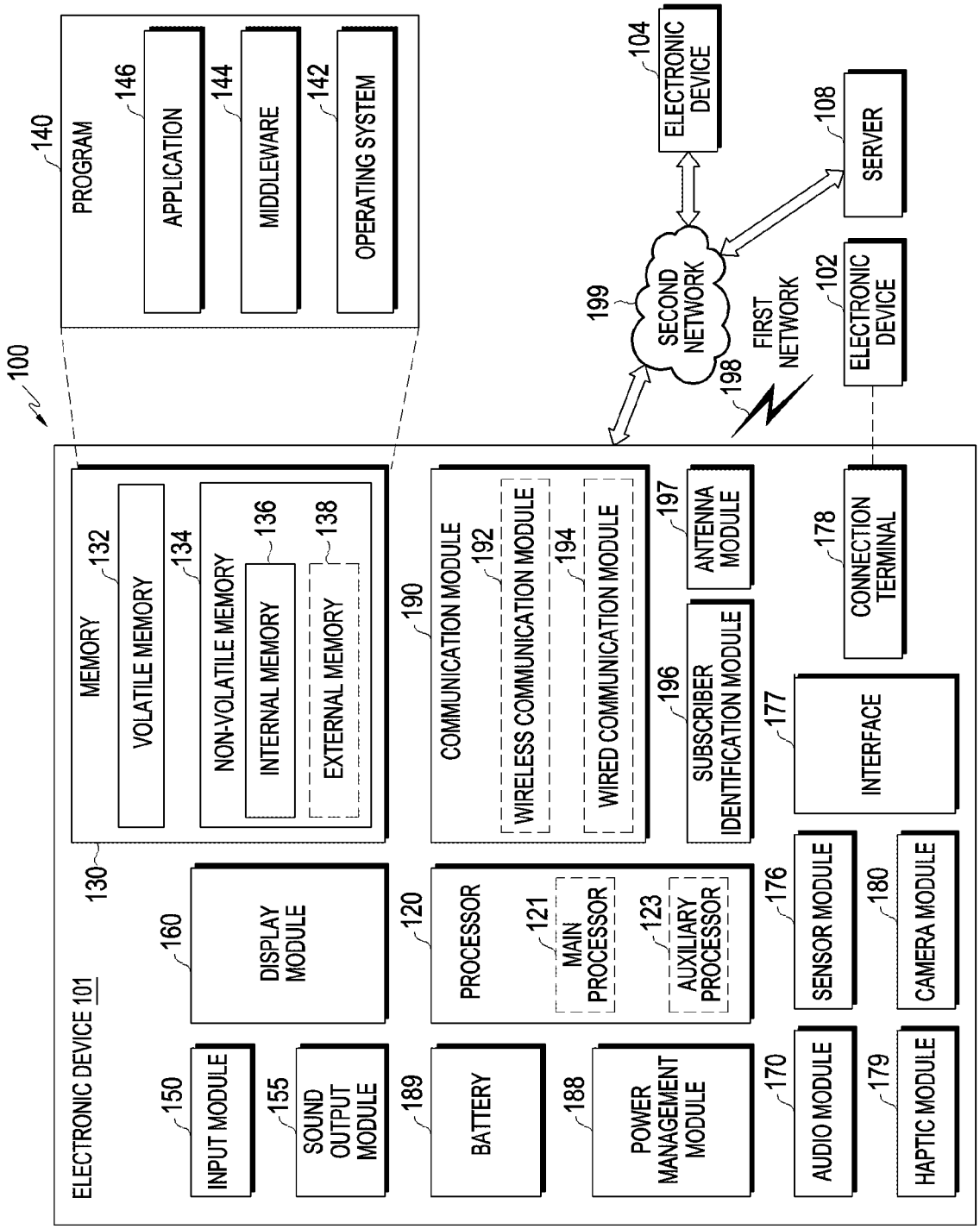
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, an electronic device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
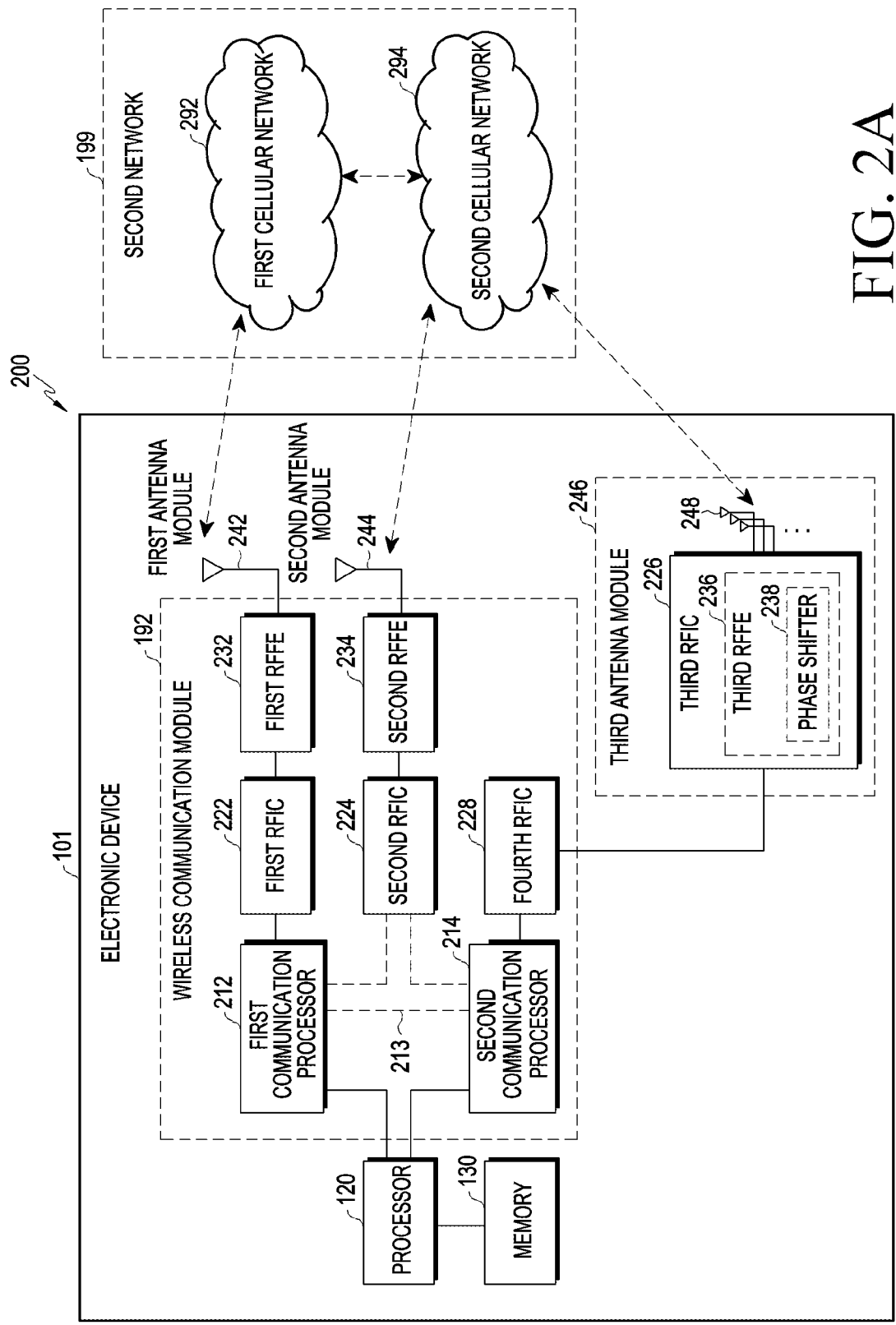
FIG. 2A is a block diagram illustrating an electronic device for supporting legacy network communication and 5G network communication according to various embodiments.
Figure 2B:
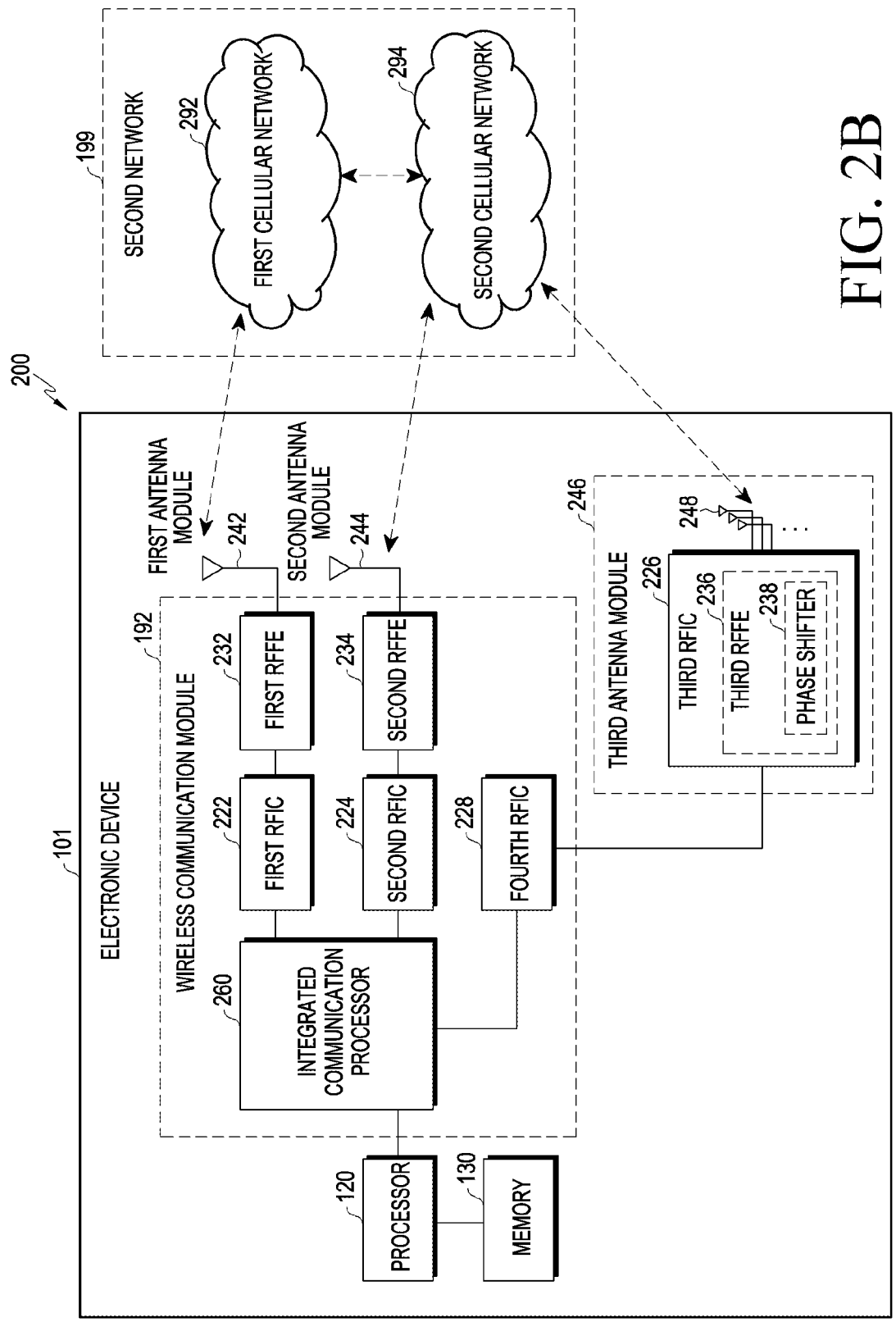
FIG. 2B is a block diagram illustrating an electronic device for supporting legacy network communication and 5G network communication according to various embodiments.

FIG. 2A is a block diagram 200 illustrating an electronic device 101 for supporting legacy network communication and 5G network communication according to various embodiments. FIG. 2B is a block diagram 200 illustrating an electronic device for supporting legacy network communication and 5G network communication according to various embodiments.

Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor (e.g., including processing circuitry) 120 and a memory 130. The second network 199 may include a first cellular network 292 and a second cellular network 294. According to an embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to an embodiment, the fourth RFIC 228 may be omitted or be included as part of the third RFIC 226.

The first communication processor 212 may include various processing circuitry and establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second CP 214 may include various processing circuitry and establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package. For example, as shown in FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

An example of an electronic device 301 is described below according to various embodiments. The description of the conventional RFFE devices 330a and 330b of the electronic device 301 as a comparative example described below is not limited to what has been described but may be applied to the RFFE device (e.g., the RFFE device 400 of FIGS. 4A and 4B) according to various embodiments.

Since the description of the electronic device 200 described in connection with FIGS. 1, 2A, and 2B may be applied to the following description of the electronic device 200, no duplicate description is given below.

Figure 3A:
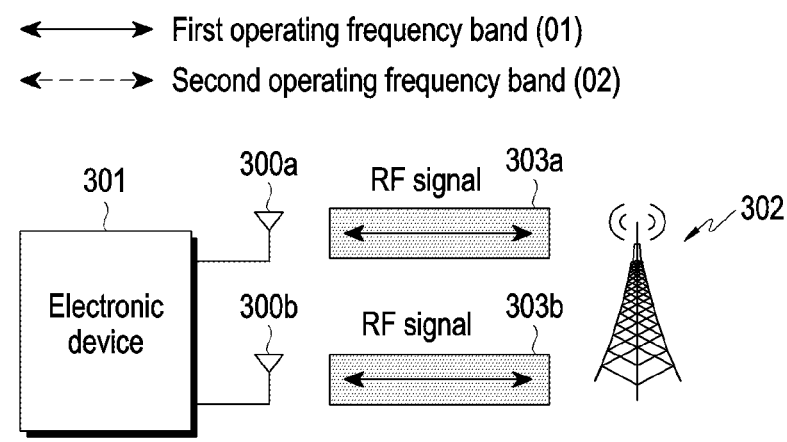
FIG. 3A is a diagram illustrating an example operation of performing communication of an electronic device according to various embodiments.

FIG. 3A is a diagram illustrating an example operation of performing communication of an electronic device according to various embodiments. FIG. 3A is described below with reference to FIG. 3B.

Figure 3A:
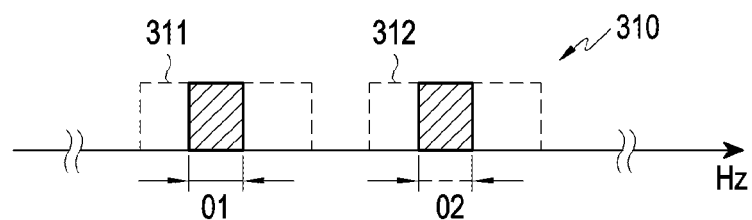
Figure 3B:
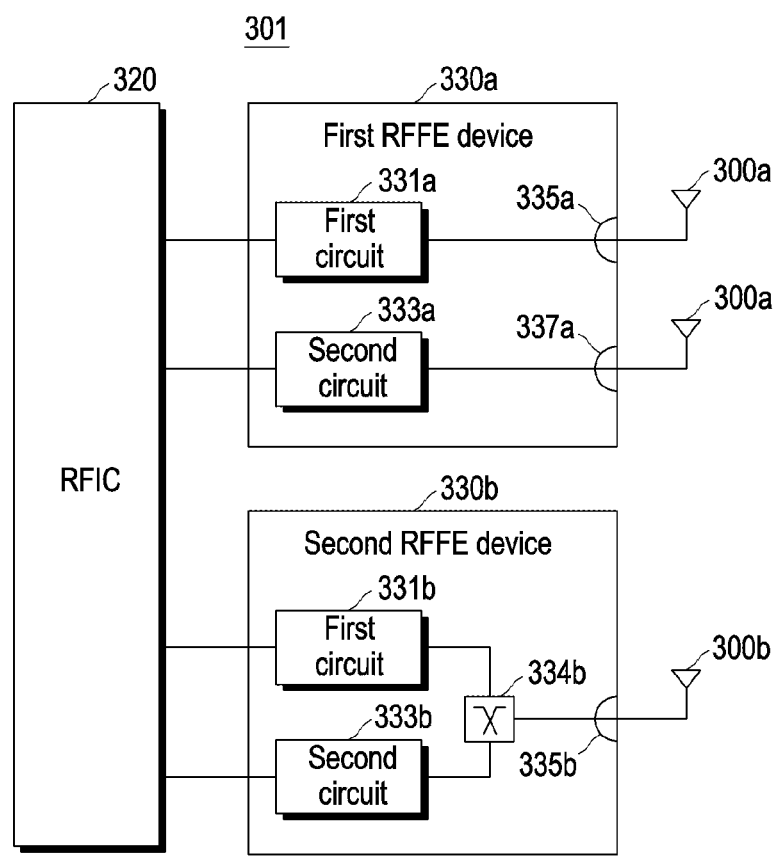
FIG. 3B is a block diagram illustrating an example configuration of a conventional RFFE device for communication of an electronic device, according to various embodiments.

FIG. 3B is a diagram illustrating an example conventional RFFE device for communication of an electronic device, according to various embodiments.

According to various embodiments, referring to FIG. 3A, an electronic device 301 may include a plurality of antennas 300a and 300b and transmit and/or receive signals (radio frequency (RF) signals) 303a and 303b to/from a base station 302 (or a network) through at least some of the plurality of antennas 300a and 300b. Transmission and/or reception of the signals (RF signals) 303a and 303b may be performed based on a plurality of frequency band groups 311 and 312. For example, referring to 310 of FIG. 3A, each of the plurality of frequency band groups 311 and 312 may correspond to a specific frequency range (or may be pre-designated). As an example, referring to Table 1 below, the plurality of frequency band groups 311 and 312 may include a first band group defined as a "high band", a second band group defined as a "mid band", and a third band group defined as a "low band". The "high band" may correspond to a frequency range not less than (or more than) 2300 MHz and not more than (or less than) 2690 MHZ, the "mid-band" may correspond to a frequency range not less than (or more than) 1710 MHz and not more than (or less than) 2200 MHz, and the "low band" may correspond to a frequency range not less than (or more than) 699 MHz and not more than (or less than) 960 MHZ but, without being limited to the numerical values described, each frequency band group 311 and 312 may be pre-defined as various numerical numbers. Each of the frequency band groups 311 and 312 may include frequency bands selectable as an operating frequency band as described in Table 1. Since the selectable frequency bands are well-known technologies disclosed as frequency range 1 (FR1) and frequency range 2 (FR2), a detailed description thereof may not be repeated here. Accordingly, the electronic device 301 may select at least one frequency band, as the operating frequency band (e.g., O1 or O2), from among the plurality of frequency bands included in at least some of the plurality of frequency band groups 311 and 312 and may transmit signals (RF signals) having the at least one selected frequency band to the base station 302 (or network) or receive the signals from the base station 302 (or network).

TABLE 1

| frequency band group | frequency range | frequency bands |
|---|---|---|
| High band (HB) | 2300 MHz ≤ HB < 2690 MHz | B7, B38, B40, B41 . . . |
| Mid band (MB) | 1710 MHz ≤ MB < 2200 MHz | B1, B2, B3, B4 . . . |
| Low band (LB) | 699 MHz ≤ LB < 960 MHz | B5, B8, B20, B28 . . . |

According to various embodiments, the conventional electronic device 301 may include different types of RFFE devices 330a and 330b for each type of the antennas 300a and 300b. For example, the types of antennas may include an antenna (e.g., the antenna 300a having the separate structure) for transmitting and/or receiving signals 303a of a single frequency band group and an antenna (e.g., the antenna 300b having the common structure) for transmitting and/or receiving signals 303b of at least two or more frequency band groups. Communication based on a plurality of frequency bands, such as E-UTRAN New Radio-Dual Connectivity (EN-DC) and carrier aggregation (CA), may be performed based on RF signals having a plurality of frequency bands output through the antenna 330b having the common structure. Without being limited thereto, the antenna 300b having the common structure may also be used for communication (e.g., Licensed-Assisted Access (LAA)) performed based on the unlicensed band and the licensed band. Referring to FIG. 3B, the first RFFE device 330a corresponding to (or connected to) the antenna 300a having the separation structure may include at least one circuit (e.g., the first circuit 331a and the second circuit 333a) each of which is implemented to process a specific frequency band group of signal and at least one port (e.g., the first port 335a and the second port 337a) connected to the at least one circuit and the antenna 300a having the separate structure. Meanwhile, without being limited to those shown, the first RFFE device 330a may include more components (e.g., the components 232 and 234 of the RFFE device described in connection with FIGS. 2A and 2B). Referring to FIG. 3B, the second RFFE device 330b corresponding to (or connected to) the antenna 300b having the common structure may further include a diplexer 334b, as compared with the first RFFE device 330a corresponding to the antenna 300a having the separation structure. For example, the second RFFE device 330b may include a plurality of circuits (e.g., the first circuit 331b and the second circuit 333b) each of which is implemented to process a specific frequency band group of signal, a port 335b connected to the antenna 300b having the common structure, and a diplexer 334b connected to each of the plurality of circuits and the port 335b. As described below, according to various embodiments, the RFFE device 400 (refer to FIG. 4A) connectible to the antenna may be provided regardless of the type of antenna (e.g., the antenna 300a having the separate structure or the antenna 300b having the common structure), which is described below with reference to FIGS. 4A and 4B. According to various embodiments, the electronic device 301 may transmit and/or receive signals based on a specific frequency band (e.g., O1 or O2) selected from a specific frequency band group among the plurality of frequency band groups 311 and 312 through the antenna 300a having the separate structure. For example, referring to FIG. 3A, a communication processor (not shown) may select a specific frequency band included in a specific frequency band group among the plurality of frequency band groups 311 and 312 and generate (or change or convert) (e.g., up-scaling) a baseband signal into a signal of the selected specific frequency band through the RFIC 320. The specific frequency band signal generated by the RFIC 320 may be transferred to the first RFFE 330a by the control of the communication processor (not shown) (e.g., control (switching) of a switch for connecting the path to the antenna corresponding to the selected specific frequency band). In the first RFFE 330a, the received signal may be pre-processed (e.g., amplified or filtered) by a circuit (e.g., the first circuit 331a or the second circuit 333a), and the preprocessed signal may be transferred through the port 335a or 337a to the antenna 300a. The signal from the antenna 300a may be generated as an RF signal having a specific frequency band (e.g., O1 or O2) and transmitted to the base station 302 (or a network). The electronic device 301 (e.g., a communication processor (not shown)) may obtain a signal of a specific frequency band through the antenna 300a, the RFFE device 330a, and the RFIC 320 corresponding to the specific frequency band O1 or O2. If the RF signal having the specific frequency band is received through the antenna 300a, the obtained signal of the specific frequency band O1 or O2 may be amplified based on the RF signal by the first RFFE device 330a, and the electronic device 301 (e.g., a communication processor (not shown)) may obtain the amplified signal through the RFIC 320. Since the above-described operation of transmitting and/or receiving a signal of the electronic device 301 is a well-known technique, a detailed description thereof may not be repeated here. According to various embodiments, the electronic device 301 may transmit and/or receive signals through the antenna 300b having the common structure, based on frequency bands included in each of at least two of the plurality of frequency band groups 311 and 312. For example, referring to FIG. 3A, the communication processor (not shown) may select frequency bands O1 and O2 included in each of at least two or more frequency band groups and may generate (or change, or convert) (e.g., up-scaling) a baseband signal to signals of the selected frequency bands O1 and O2 through the RFIC 320. Each of the signals of the frequency bands generated by the RFIC 320 may be transferred to the second RFFE 330b by the control of the communication processor (not shown) (e.g., control (switching) of a switch for connecting the path to the antenna corresponding to the selected specific frequency band). In the second RFFE device 330b, each of the received signals may be preprocessed (e.g., amplified or filtered) by the circuits (e.g., the first circuit 331b and the second circuit 333b), and that the pre-processed signals may be input to the diplexer 334b. The signals may be synthesized (or generated) into a signal having the selected frequency bands by the diplexer 334b, and the synthesized signal may be output through the diplexer and transferred to the antenna 300b. An RF signal having the plurality of frequency bands O1 and O2 may be generated from the antenna 300b and transmitted to the base station 302 (or network). Conversely, the electronic device 301 (e.g., a communication processor (not shown)) may obtain the RF signal of the specific frequency bands through the antenna 300b, the second RFFE device 330b, and the RFIC 320 corresponding to the specific frequency band O1 or O2. If the RF signals having the specific frequency bands (e.g., O1 and O2) are received through the antenna 300b, the obtained signals of the specific frequency bands O1 or O2 may be amplified based on the RF signals by the diplexer 334b of the first RFFE device 330a, and the electronic device 301 (e.g., a communication processor (not shown)) may obtain the amplified signals through the RFIC 320. Since the above-described operation of transmitting and/or receiving a signal of the electronic device 301 is a well-known technique, a detailed description thereof may not be repeated here.

Hereinafter, an example of a configuration of the RFFE device 400 according to various embodiments is described in greater detail.

Figure 4A:
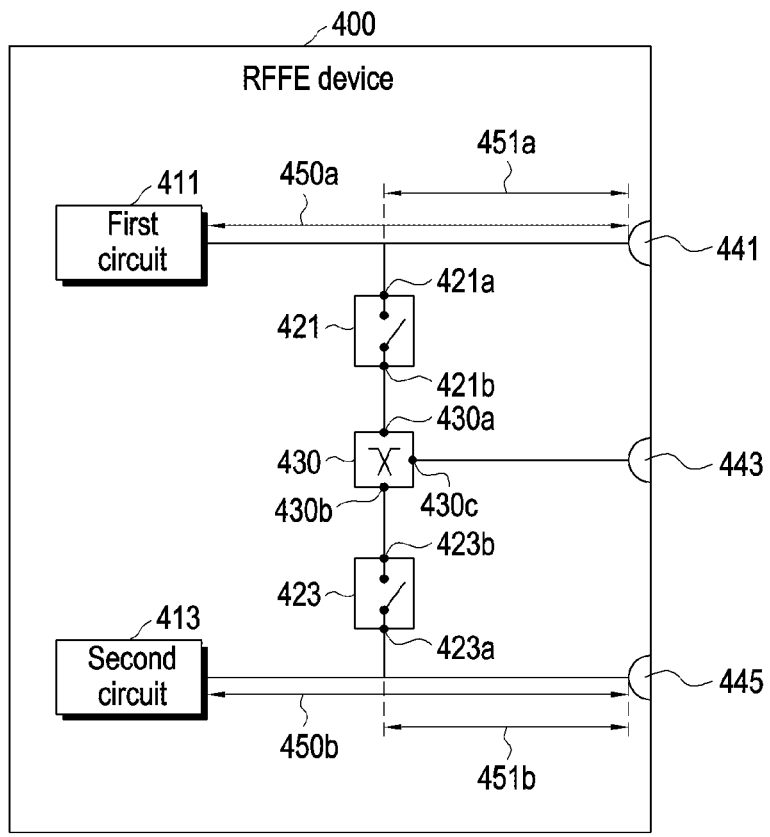
FIG. 4A is a diagram illustrating an example configuration of an RFFE device connectable to both an antenna having a separate structure and an antenna having a common structure according to various embodiments.

FIG. 4A is a diagram illustrating an example configuration of an RFFE device 400 connectable to both an antenna 300a having a separate structure and an antenna 300b having a common structure according to various embodiments. FIG. 4A is described below with reference to FIG. 4B.

Figure 4B:
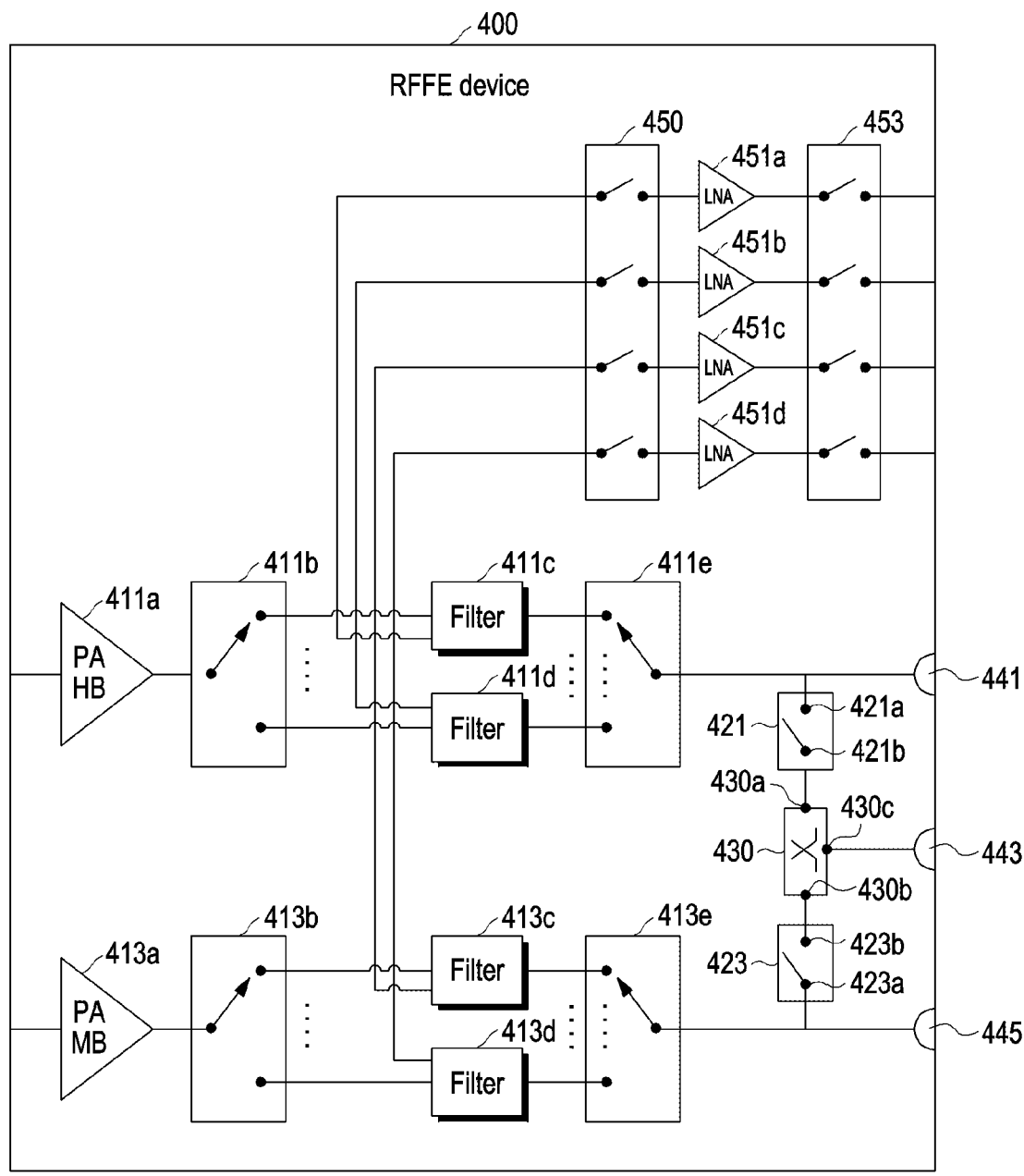
FIG. 4B is a diagram illustrating example circuits (e.g., a first circuit and a second circuit) of an RFFE device according to various embodiments.

FIG. 4B is a diagram illustrating an example of circuits (e.g., a first circuit 411 and a second circuit 413) of an RFFE device 400 according to various embodiments.

According to various embodiments, referring to FIG. 4A, an RFFE device 400 connectable to an antenna regardless of the type of the antenna (e.g., the antenna 300a having the separate structure or the common structure) may include a plurality of circuits 410 (e.g., the first circuit 411 and the second circuit 413), a plurality of switches 420 (e.g., a first switch 421 and a second switch 423), a diplexer 430, a plurality of ports 440 (e.g., a first port 443, a second port 441, and a third port 445), and at least one conductive line 450a and 450b. The conductive lines 450a and 450b may be lines formed of a conductive material (e.g., metal) implemented inside and/or outside the chip set to electrically connect the components (or electrical components) (e.g., the plurality of circuits 410 (e.g., the first circuit 411 and the second circuit 413), the plurality of switches 420 (e.g., the first switch 421 and the second switch 423), the diplexer 430, and the plurality of ports 440 (e.g., the first port 443, the second port 441, and the third port 445)). Meanwhile, without being limited to what is shown and/or described, the RFFE device 400 may be implemented to include more components. For example, the RFFE device 400 may be implemented to include more components, without being limited to the number of illustrated components (e.g., the circuits 410, the switches 420, the diplexer 430, and the ports 440). The RFFE device 400 may be LFEMiD (low band (FEMiD for low band)), OMH PAMID (FEMiD including a power amplifier (PA) for mid band/high band), or front-end module with integrated duplexers (diplexers) (FEMiD) but, without being limited thereto, may be various types of RFFE modules connectable to a plurality of antennas.

According to various embodiments, each of the plurality of circuits 410 may be implemented to process signals of different frequency band groups (or frequency bands). For example, each of the plurality of circuits 410 may include at least one power amplifier (PA) 411a and 413a and/or at least one low noise amplifier (LNA) 451a, 451b, 451c, and 451d, at least one switch 411b, 411e, 413b, 413e, 470, and 473, and at least one filter 411c, 411d, 413c, and 413d, as illustrated in 4B. For example, referring to FIG. 4B, the first circuit 411 may include the power amplifier 411a implemented to a signal of a specific frequency band group (e.g., high band HB) input from an RFIC (e.g., the RFIC 320 of FIG. 3A), a switch 411b for selectively electrically connecting and/or separating the power amplifier 411a and the filter 411c or 411d to transfer the signal amplified by the power amplifier 411a to the filter 411c or 411d corresponding to a frequency band (e.g., the operating frequency band) selected from the specific frequency band group, a switch 411e for electrically connecting and/or separating the selected filter 411c or 411d and a second port 441, a switch 470 for selectively electrically connecting and/or separating the filter 411c or 411d and a low noise amplifier 451a, 451b, 451c, or 451d to transfer to the low noise amplifier 451a, 451b, 451c, or 451d of the specific frequency band corresponding to the signal received from the filter 411c or 411d, and a switch 473 for electrically connecting and/or separating the low noise amplifier 451a, 451b, 451c, or 451d and the RFIC (e.g., the RFIC 320 of FIG. 3A). As another example, referring to FIG. 4B, the second circuit 413 may include the power amplifier 413a implemented to a signal of a specific frequency band group (e.g., mid band HB) input from an RFIC (e.g., the RFIC 320 of FIG. 3A), a switch 413b for selectively electrically connecting and/or separating the power amplifier 413a and the filter 413c or 413d to transfer the signal amplified by the power amplifier 413a to the filter 413c or 413d corresponding to a frequency band (e.g., the operating frequency band) selected from the specific frequency band group, a switch 413e for electrically connecting and/or separating the selected filter 413c or 413d and the third port 445, the switch 470 for selectively electrically connecting and/or separating the filter 413c or 413d and the low noise amplifier 451a, 451b, 451c, or 451d to transfer to the low noise amplifier 451a, 451b, 451c, or 451d of the specific frequency band corresponding to the signal received from the filter 413c or 413d, and the switch 473 for electrically connecting and/or separating the low noise amplifier 451a, 451b, 451c, or 451d and the RFIC (e.g., the RFIC 320 of FIG. 3A). Since the operation of the components included in each of the circuits 411 and 413 is a well-known technique, a detailed description thereof may not be repeated here.

According to various embodiments, the RFFE device 400 may transfer a signal to, or receive a signal from, a specific antenna through each of the plurality of ports 440. Each of the plurality of ports 440 may be connected to the above-described circuit (e.g., the first circuit 411 and the second circuit 413) through the conductive line (e.g., 450a and 450b) inside the RFFE device 400. Further, each of the plurality of ports 440 may be connected to a specific antenna outside the RFFE device 400. The circuit (e.g., the first circuit 411 or the second circuit 413) of the RFFE device 400 may receive a signal from an RFIC (e.g., the RFIC 320 of FIG. 3) and may process the reception signal (e.g., by the power amplifiers 411a and 413a and/or the filters 411c, 411d, 413c, and 413e). The processed signal may be transferred through one port (e.g., the first port 443, the second port 441, or the third port 445) to the antenna connected to the one port (e.g., the first port 443, the second port 441, or the third port 445). The transferred signal may be converted into an RF signal through the antenna and may be output to the outside (e.g., transmitted to the base station 302 (or network)). Further, the RF signal received by the antenna may be converted into a signal, and the signal may be transferred through one port (e.g., the first port 443, the second port 441, or the third port 445) to the circuit connected to the one port (e.g., the second port 441). The received signal may be processed (e.g., processed by the filter 411c, 411d, 413c, and 413e and/or the low noise amplifier 451a, 451b, 451c, and 451d) by the circuit (e.g., the first circuit 411 or second circuit 413), and the processed signal may be transferred from the RFFE device 400 to the RFIC (e.g., the RFIC 320 of FIG. 3).

Hereinafter, implementation examples of the plurality of switches 420 and the diplexer 430 according to various embodiments are described in greater detail.

As compared with the RFFE device (e.g., the RFFE devices 330a and 330b of FIG. 3B) of the conventional electronic device 301, the RFFE device 400 according to various embodiments may further include a plurality of switches 420 and a diplexer 430. Thus, the RFFE device 400 may be connected to an antenna regardless of the type of antenna (e.g., the antenna 300a having the separate structure and the antenna 300b having a common structure). For example, the RFFE device 400 may be used regardless of the type of antenna (e.g., the antenna 300a having the separate structure and the antenna 300b having the common structure) according to the electrical connection or separation state between the components (or electrical components) determined depending on the state (e.g., a closed state or opened state) of the switches and the connection relationship between the plurality of switches 420 and the diplexer 430 described below.

According to various embodiments, the diplexer 430 may be a passive element for multiplexing in the frequency domain. The multiplexing may refer to an operation for integrating a plurality of frequency channels into one frequency channel and/or separating one frequency channel into a plurality of frequency channels. For example, signals having a plurality of frequency bands received by the diplexer 430 may be integrated (or generated, or converted) into one signal, and/or one signal may be separated (or generated or converted) into signals having a plurality of frequency bands. For the multiplexing, the diplexer 430 may include a plurality of ends 430a, 430b, and 430c and a plurality of filters (not shown) corresponding to a plurality of frequency bands. Each of the plurality of filters may output a signal of a specific frequency band corresponding to the filter in response to the signal received by the filter. As an example, the plurality of filters may include a high pass filter (HPF) and a low pass filter (LPF), but are not limited thereto. Each of some (e.g., the first end 430a and the second end 430b) of the plurality of ends 430a, 430b, and 430c of the diplexer 430 may be electrically connected with a switch (e.g., the first switch 421 or the first stage 430b), and the remaining end (e.g., the third end 430c) may be electrically connected with a specific port (e.g., the first port 443). As described above, the first port 443 to which a specific end (e.g., the third end 430c) of the diplexer 430 is connected may be a port implemented to be connected to the antenna 300b having the common structure. Meanwhile, instead of the diplexer 430, elements (e.g., a duplexer) for multiplexing a plurality of frequency band groups may be provided.

According to various embodiments, each of the plurality of switches 420 may electrically connect or electrically separate a component (or circuit, device, or electrical component) connected to one end (e.g., 421a or 423a) of the switch and a component (or circuit, device, or electrical component) connected to the other end (e.g., 421b or 423b) depending on the state. The state may include an opened state and a closed state, and when the state of the switch 420 is the closed state, the components may be electrically connected, and when the state is the open state, the components may be electrically separated. The respective states of the plurality of switches 420 may be controlled by a communication processor (not shown). For example, the plurality of switches 420 may be implemented as, but not limited to, a silicon controlled rectifier (SCR), triode AC switch (TRAIAC), gate turn-off thyristor (GTO), insulated gate bidirectional transistor (IGBT), or metal oxide semiconductor field effect transistor (MOSFET), which includes a gate and whose state is controlled depending on the direction (e.g., a positive direction or negative direction) of the current or voltage applied to the gate, or as a silicon symmetrical switch (SSS) whose state is controlled depending on whether voltage is applied to both terminals instead of a gate. For example, referring to FIG. 4A, one end 421a of the first switch 421 may be connected to the first circuit 411 and the second port 441, and the other end 423a may be connected to the first end 430a of the diplexer 430. When the first switch 421 is controlled to be the closed state, the first end 430a of the diplexer 430 may be electrically connected to the first circuit 411 and the second port 441. Further, when the first switch 421 is controlled to be the open state, the first end 430a of the diplexer 430 may be electrically separated from the first circuit 411 and the second port 441. Further, for example, referring to FIG. 4A, one end 423a of the second switch 423 may be connected with the second circuit 413 and the third port 445, and the other end 423b may be connected with the second end 430b of the diplexer 430. The electrical connection state and separation state between the components according to the state of the second switch 423 are the same as or similar to the electrical connection state and separation state between the components according to the state of the first switch 421, so duplicate description may not be provided. Accordingly, when the switches 421 and 423 are in the opened state, the circuits (e.g., the first circuit 411 and/or the second circuit 413) and the ports (e.g., the second port 441 and/or the third port 445 only may be electrically connected through the conductive line (e.g., 450a and/or 450b) and, when the switches are in the closed state, the circuits may be electrically connected with ports as well as some ends (e.g., the first end 430a and the second end 430b) of the diplexer 430. Meanwhile, as is described below, the communication processor (not shown) may control the state of the switches (e.g., the first switch 421 and the second switch 423) as the state corresponding to the type of the antenna connected to the RFFE device 400 and transmit and/or receive a signal based on the electrical connection state or separation state between the components according to the state of the switches (e.g., the first switch 421 and the second switch 423), which is described below. Meanwhile, to prevent/reduce communication degradation caused due to some (e.g., 451a or 451b) of the conductive lines (e.g., 450a and 450b), matching circuits 551 and 553 may be disposed outside the RFFE device 400 (e.g., a board (e.g., a printed circuit board (PCB) or a flexible printed circuit board (FPCB)) on which the RFFE device 400 is disposed).

Described below is an example of an electronic device 301 including an RFFE device 400 connected to antennas 300a having a separate structure or an RFFE device 400 connected to an antenna 300b having a common structure according to various embodiments. Although described with separate examples, the electronic device 301 according to various embodiments may include a plurality of RFFE devices 400, and each of the plurality of RFFE devices 400 may be connected to the antenna 300a having the separate structure or the antenna 300b having the common structure and, in this case, the description of FIGS. 5A and 5B may be applied.

Figure 5A:
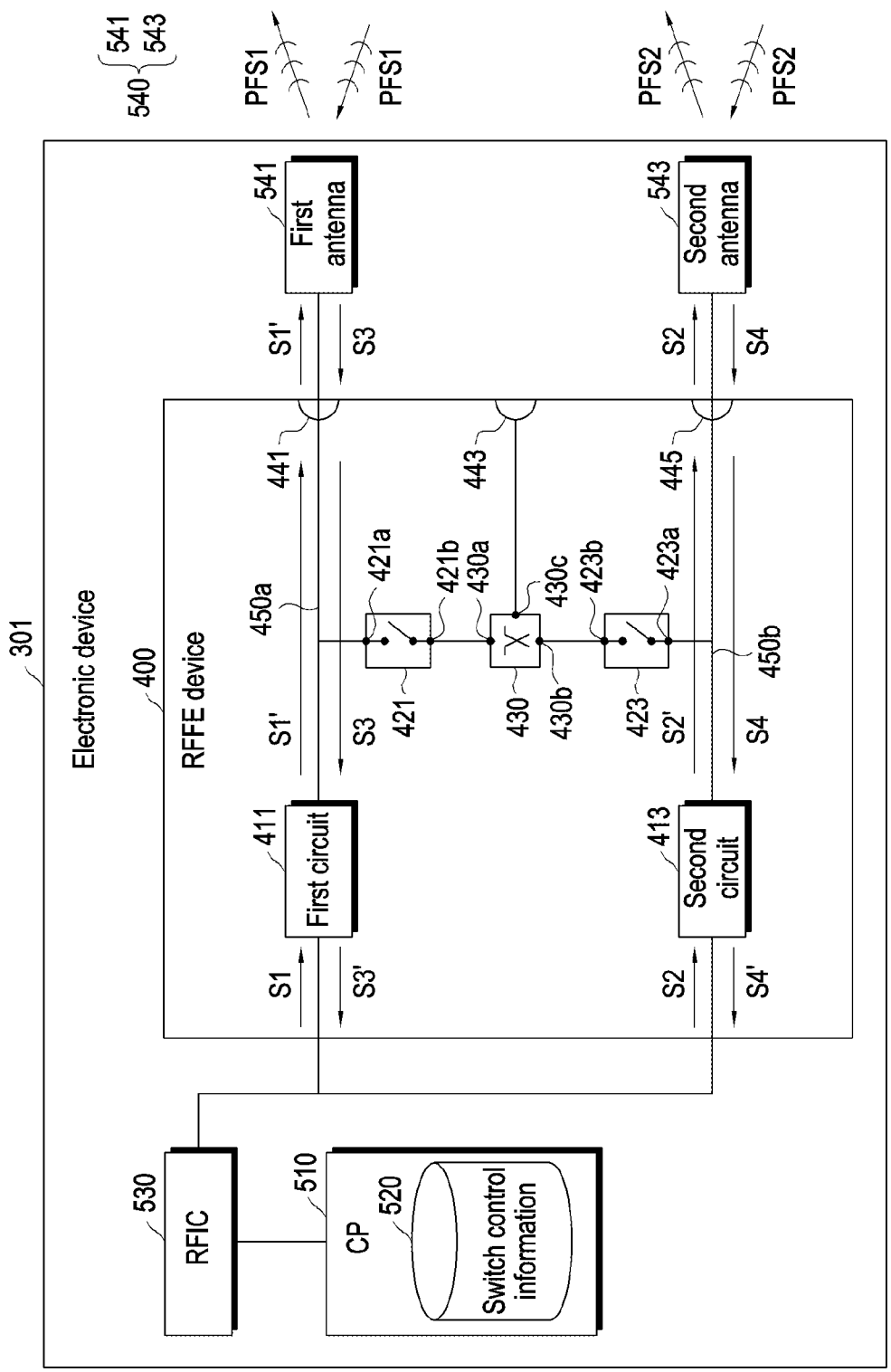
FIG. 5A is a diagram illustrating an example configuration of an electronic device including an RFFE device connected to antennas having a separation structure according to various embodiments.

FIG. 5A is a diagram illustrating an example configuration of an electronic 301 or 210 device including an RFFE device 400 connected to antennas 300a having a separation structure according to various embodiments.

According to various embodiments, referring to FIG. 5A, an electronic device 301 may include a plurality of antennas 330a (e.g., a first antenna 541 and a second antenna 543) having a separate structure, an RFIC 530 (e.g., the RFIC 320 of FIG. 3B), a communication processor (e.g., including processing circuitry) 510, a memory 520 (e.g., ROM), and an RFFE device 400 (e.g., the RFFE device 400 described in connection with FIGS. 4A and 4B). In this case, the states of the switches (e.g., the first switch 421 and the second switch 423) included in the RFFE device 400 may be controlled to the open state. Meanwhile, without being limited to what is shown and/or described, the electronic device 301 may be implemented to include more components. For example, the electronic device 301 may be implemented to further include components of the electronic device 301 described above with reference to FIG. 1. As another example, the electronic device 301 may be implemented to include more RFFE devices and antennas.

According to various embodiments, the plurality of antennas (e.g., the first antenna 541 and the second antenna 543)

may be antennas 300a having the separate structure. As described above in connection with FIGS. 3A and 3B, the antenna 300a having the separate structure may be an antenna implemented to transmit and/or receive a signal of a specific frequency band group among a plurality of frequency band groups 311 and 312. Each of the plurality of antennas (e.g., the first antenna 541 and the second antenna 543) may be implemented to transmit and/or receive a signal of a specific frequency band group (e.g., high-band, mid-band, or low-band). For example, the antennas (e.g., the first antenna 541 and the second antenna 543) may be implemented to further include circuits for processing (e.g., converting into an RF signal or converting an RF signal into a signal) the signal of the specific frequency band group and/or to have a physical structure (e.g., a length, area, or pattern) corresponding to the specific frequency band.

According to various embodiments, at least some (e.g., the second port 441 and the third port 445) of the plurality of ports 441 and 445 of the RFFE device 400 may be connected with an antenna, and the remaining some (e.g., the first port 443) may not be connected. As described above with reference to FIGS. 4A and 4B, at least some of the plurality of ports 441, 443, and 445 may be ports implemented to be connected with the antenna 300a having the separate structure. Each port (e.g., the second port 441 or the third port 445) and the antenna (e.g., the first antenna 541 or the second antenna 543) connected with each port may be associated with the same frequency band group. For example, the second port 441 corresponding to the first frequency band group (e.g., high band) (e.g., connected with the first circuit 411 implemented to process the signal of the first frequency band group) may be connected with the first antenna 541 for transmitting and/or receiving signals of the first frequency band group. As another example, the third port 445 corresponding to the second frequency band group (e.g., low band) (e.g., connected with the second circuit 413 implemented to process the signal of the second frequency band group) may be connected with the second antenna 543 for transmitting and/or receiving signals of the second frequency band group. Meanwhile, without being limited to what is illustrated and/or described, some of the first port 443 and the second port 441 may not be connected with an antenna.

According to various embodiments, the communication processor 510 may transmit and/or receive a signal of a specific frequency band group through one antenna (e.g., the first antenna 541 or the second antenna 543).

In an embodiment, when a communication event (e.g., cell connection, handover, change in signal characteristics (e.g., RSRP, RSSI)) occurs, the communication processor 510 may select a specific frequency band, as the operating frequency band, from the plurality of frequency band groups 311 and 312 and control the RFIC 530 (e.g., the RFIC 320 of FIG. 3B) to convert a baseband signal into a signal of the selected specific frequency band and transfer the converted signal to an antenna (e.g., the first antenna 541 or the second antenna 543) corresponding to the specific frequency band through the RFFE device 400. For example, the communication processor 510 may identify the first frequency band (e.g., the n46 band in Table 1) included in the high band, as the operating frequency band and enable the RFIC 530 (e.g., the RFIC 320 of FIG. 3B) to convert the baseband signal to a first signal S1 of the identified first frequency band and transfer the converted first signal S1 from the RFIC 530 (e.g., the RFIC 320 of FIG. 3B) to the first antenna 541 corresponding to the first frequency band (or high band). In this case, to transfer the signal of the specific frequency band output from the RFIC 530 (e.g., the RFIC 320 of FIG. 3B) to the specific antenna (e.g., the first antenna 541) and the RFFE device 400 for processing the signal of the specific frequency band among the plurality of RFFE devices, the communication processor 510 may control the connection state of the switches associated with the components (e.g., the RFIC 530 (e.g., the RFIC 320 of FIG. 3B), the specific RFFE device 400, and the specific antenna) among the plurality of switches 420 so that the RFIC 530 (e.g., the RFIC 320 of FIG. 3B), the RFFE device 400, and the specific antenna are connected. As part of the operation of controlling the state of the switch, the communication processor 510 may control the switch so that the RFIC 530 (e.g., the RFIC 320 of FIG. 3B) is electrically connected with the circuit (e.g., the first circuit 411) for processing the first signal S1 of the first frequency band included in the RFFE device 400. Since the switch control operation of the communication processor 510 is a well-known technique, a detailed description thereof may not be repeated here. The first circuit 411 included in the RFFE device 400 may process (e.g., amplify or filter) the first signal S1 and may output the processed first signal S1'. The processed first signal S1' may be transferred from the first circuit 411 to the second port 441 through the conductive line 450a based on the first switch 421 being controlled to the opened state and may be transferred to the first antenna 541 through the second port 441. Based on the processed first signal S1', a first RF signal RFS1 may be transmitted from the first antenna 541 to the base station. Similarly, when a band (e.g., mid band or low band) other than the high band is selected by the communication processor 510, the second signal S2 of the band is transferred to the second circuit 413, and the processed second signal S2 is transferred to the second antenna 543, and, thus, the second RF signal RFS2 may be output. Thus, a duplicate description may not be repeated.

In an embodiment, when an RF signal (e.g., RFS1 or RFS2) of a specific frequency band is received through an antenna, the communication processor 510 may obtain a signal of the specific frequency band through the RFFE device 400 and the RFIC 530 (e.g., the RFIC 320 of FIG. 3B). For example, when the RF signal RFS1 of the specific frequency band (e.g., a frequency band among high bands) is received by the first antenna 541, the third signal S3 output from the first antenna 541 may be transferred to the first circuit 411 through the second port 441 and the conductive line 450a based on that the second switch 423 being controlled to the opened state. The third signal S3 processed (e.g., amplified or filtered) and output by the first circuit 411 may be transferred to the RFIC 530. The communication processor 510 may obtain information corresponding to the third signal S3 by the RFIC 530. Similarly, when the RF signal RFS2 of another band (e.g., mid-band, or low-band) is received by the second antenna 543, the fourth signal S4 is processed by the second circuit 413, and the processed fourth signal S4' is provided to the RFIC 530, so that the communication processor 510 may obtain information.

According to various embodiments, the communication processor 510 may control the states of the plurality of switches 420 included in the RFFE device 400 to the opened state based on the switch control information pre-stored in the memory 520. The memory 520 may be implemented in the communication processor 510. When the electronic device 301 turns on, the communication processor 510 may control the states of the plurality of switches 420 included in the RFFE device 400 by referring to the switch control information stored in the memory 520. As the states of the plurality of switches 420 are controlled to the opened state, signal transmission and/or reception may be performed as described above.

Figure 5B:
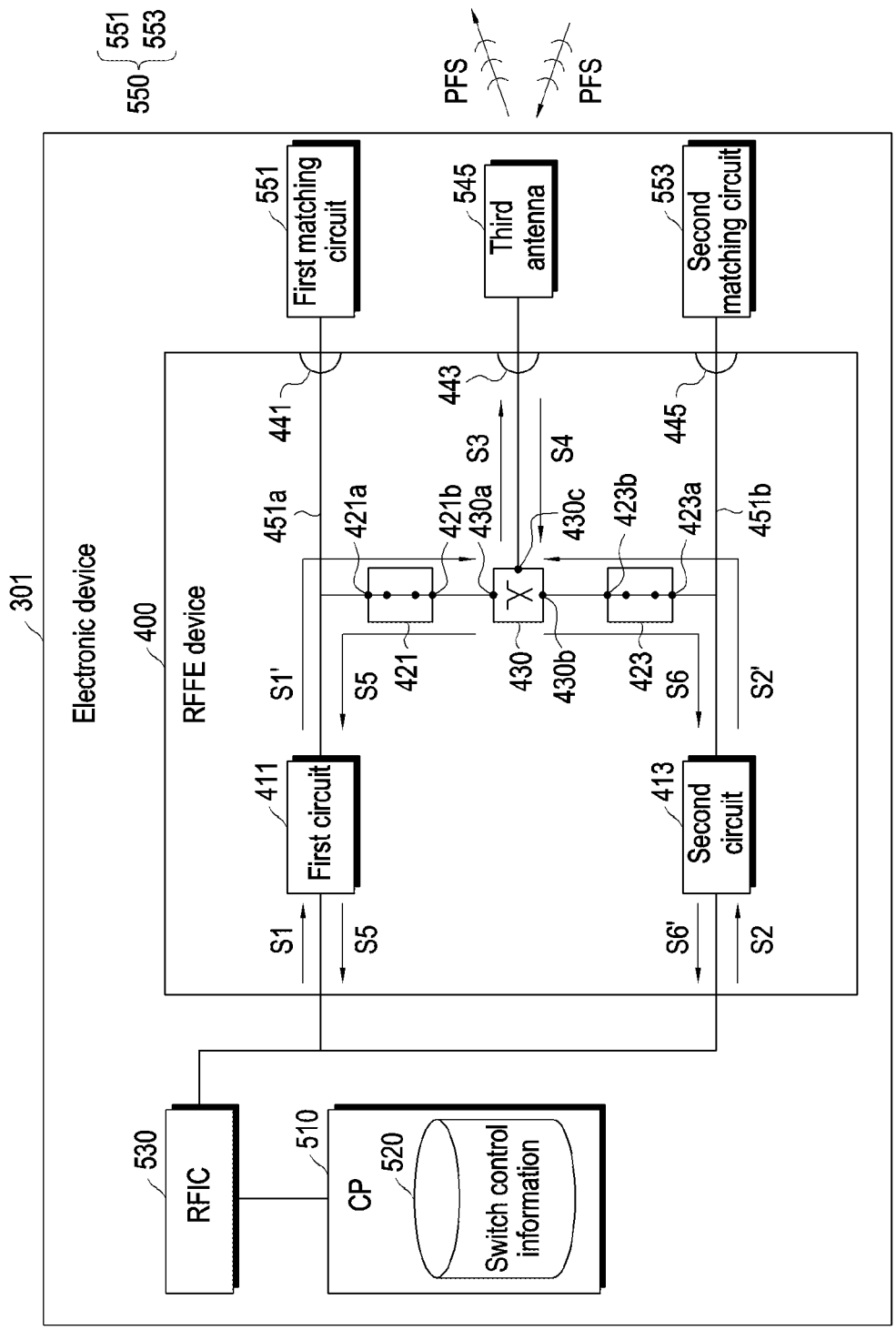
FIG. 5B is a diagram illustrating an example configuration of an electronic device including an RFFE device connected to an antenna having a common structure, according to various embodiments.

FIG. 5B is a diagram illustrating an example configuration of an electronic device 301 or 210 including an RFFE device 400 connected to an antenna 300b having a common structure, according to various embodiments. Hereinafter, with reference to FIGS. 6A, 6B and 6C, FIG. 5B is further described.

Figure 6A:
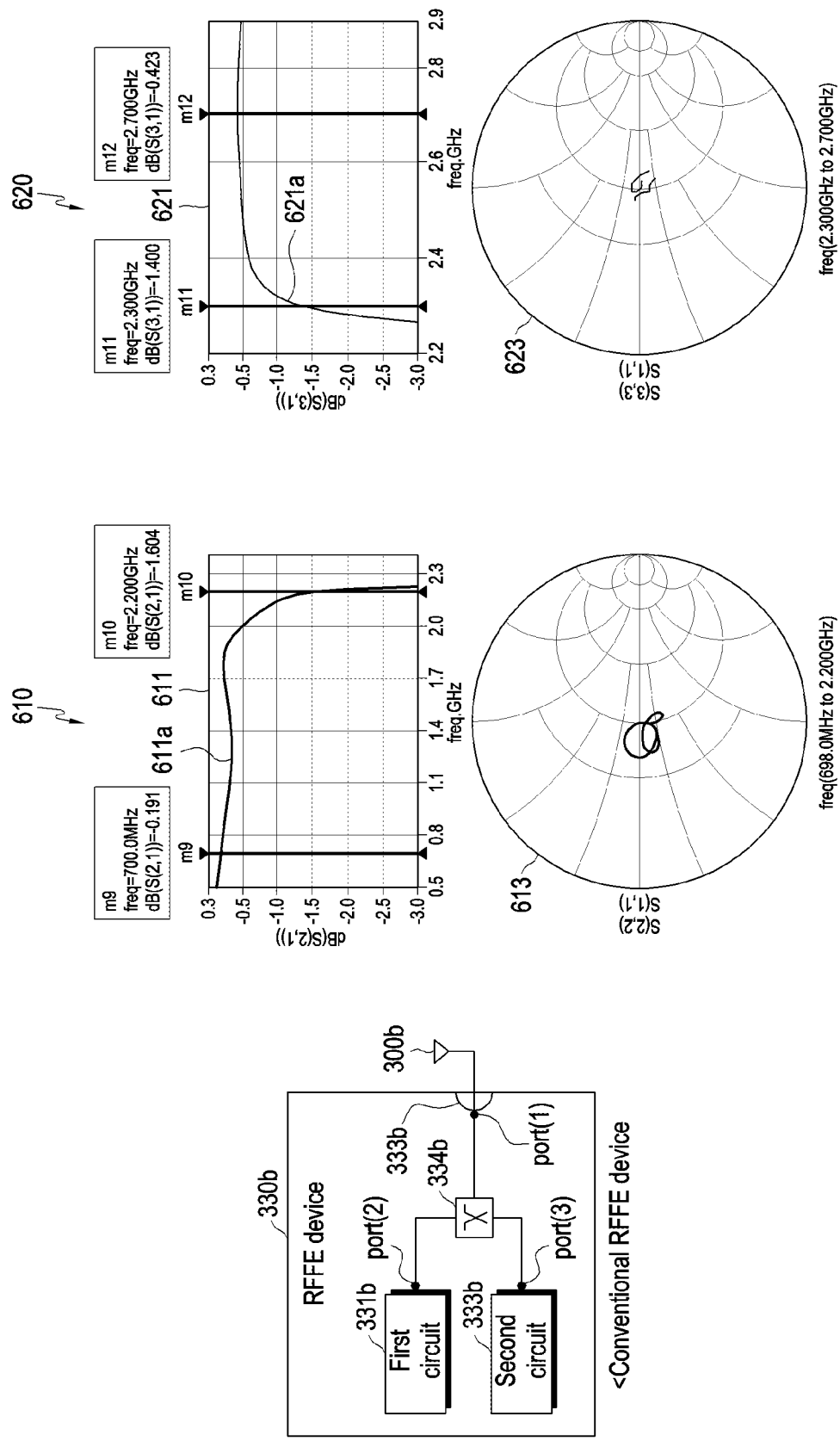
FIG. 6A is a diagram illustrating an example Smith chart showing a degree of impedance matching associated with a conventional RFFE device, as a comparative example.
Figure 6B:
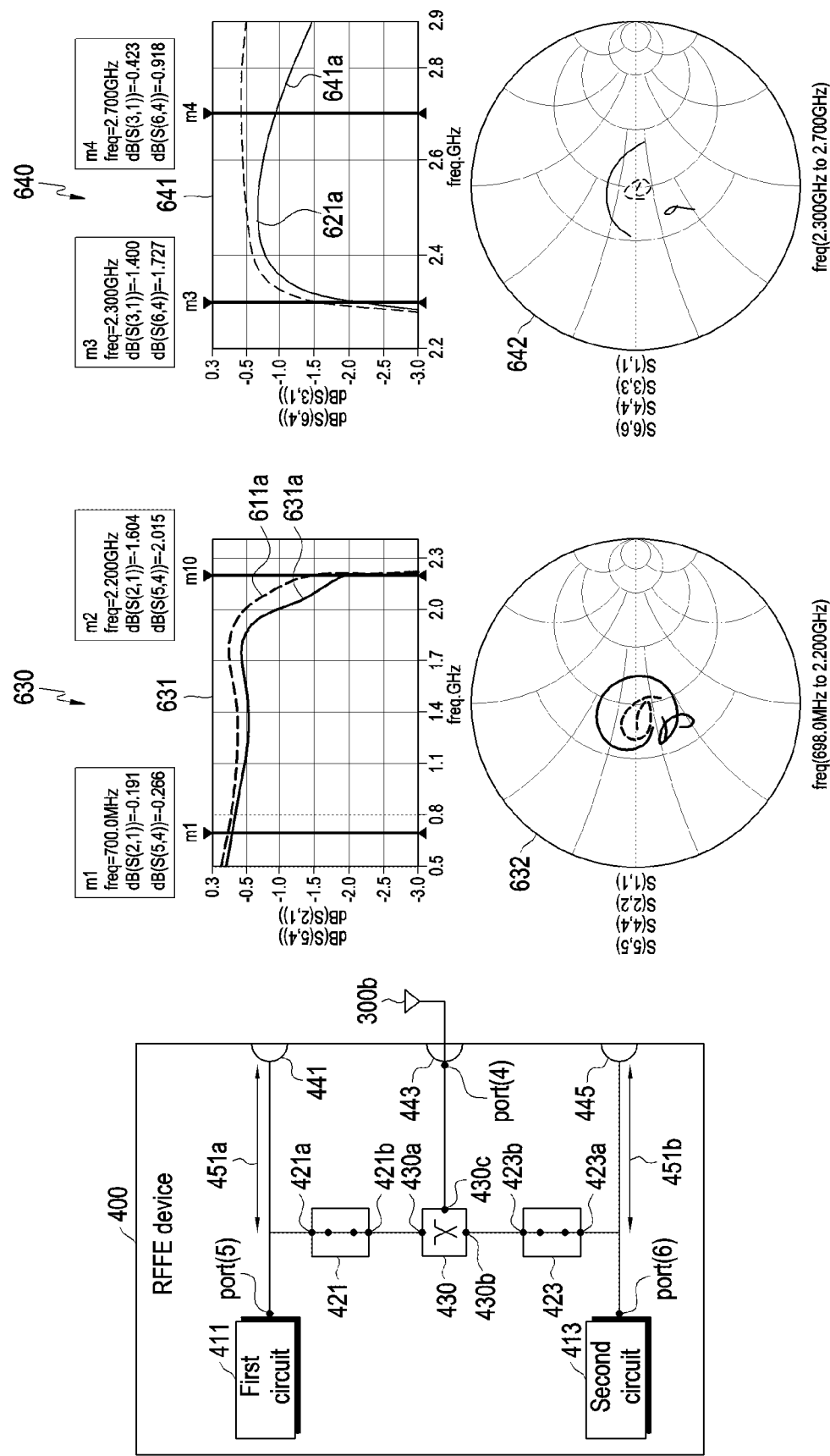
FIG. 6B is a diagram illustrating an example Smith chart showing a degree of impedance matching when a plurality of matching circuits are not provided, as a comparative example.
Figure 6C:
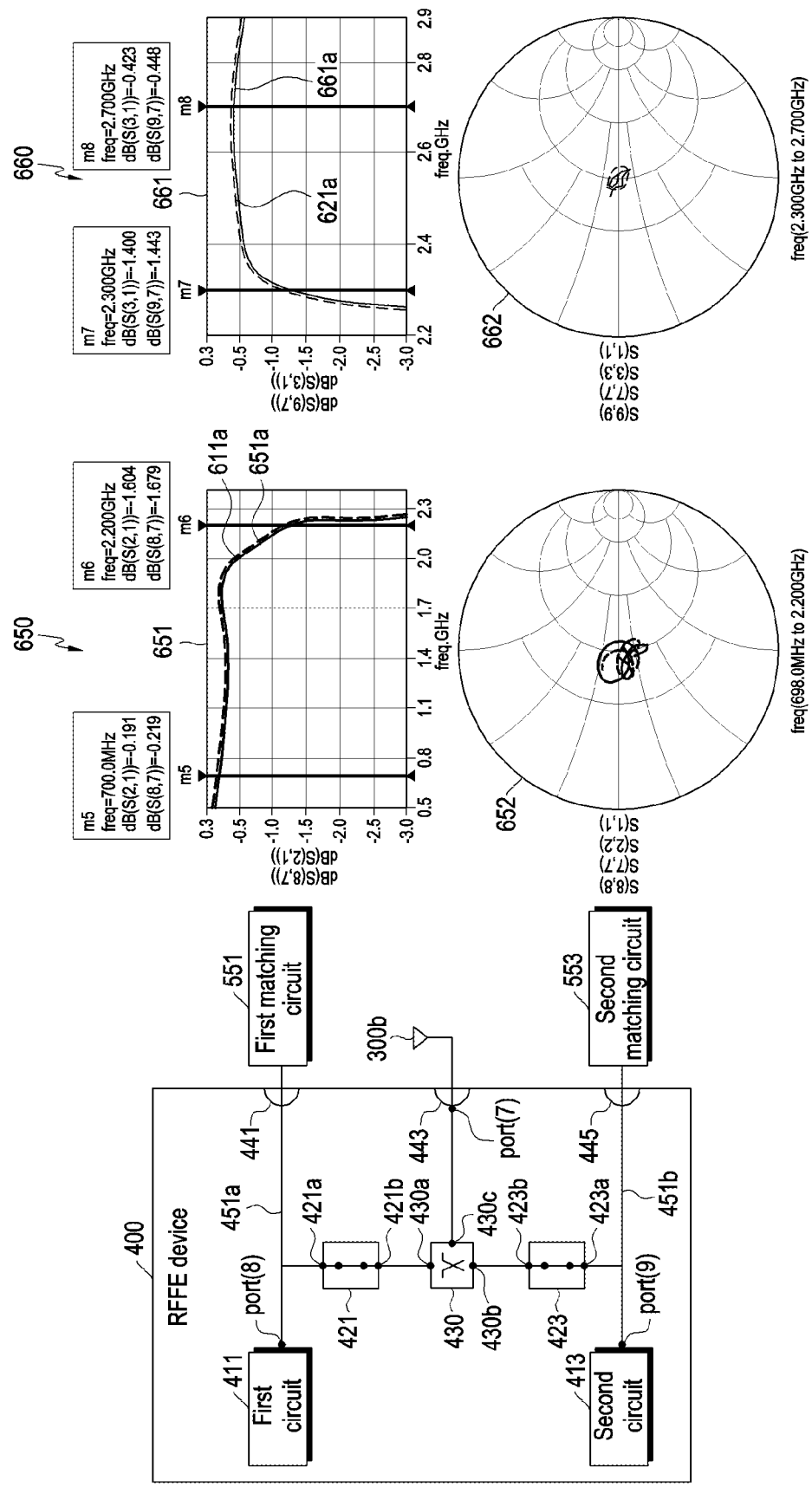
FIG. 6C is a diagram illustrating an example Smith chart showing a degree of impedance matching when a plurality of matching circuits are provided, according to various embodiments.

FIG. 6A illustrates an example of a Smith chart showing a degree of impedance matching associated with a conventional RFFE device 400, as a comparative example. FIG. 6B illustrates an example of a Smith chart showing a degree of impedance matching when a plurality of matching circuits 550 are not provided, as a comparative example. FIG. 6C illustrates an example Smith chart showing a degree of impedance matching when a plurality of matching circuits 550 are provided, according to various embodiments.

According to various embodiments, referring to FIG. 5B, the electronic device 301 may include an antenna 330b (e.g., the third antenna 545) having a common structure, an RFIC 530 (e.g., the RFIC 320 of FIG. 3B), a communication processor 510, a memory 520 (e.g., ROM), an RFFE device 400 (e.g., the RFFE device 400 described above in connection with FIGS. 4A and 4B), and a plurality of matching circuits 550 (e.g., the first matching circuit 551 and the second matching circuit 553). In this case, the states of the switches (e.g., the first switch 421 and the second switch 423) included in the RFFE device 400 may be controlled to the closed state. Meanwhile, without being limited to what is shown and/or described, the electronic device 301 may be implemented to include more components. For example, the electronic device 301 may be implemented to further include components of the electronic device 301 described above with reference to FIG. 1. As another example, the electronic device 301 may be implemented to include more RFFE devices and antennas.

According to various embodiments, the third antenna 545 may be the antenna 300b having the common structure. As described above in connection with FIGS. 3A and 3B, the antenna 300b having the common structure may be an antenna implemented to transmit and/or receive signals of two or more frequency band group among a plurality of frequency band groups 311 and 312. The antenna 300b having the common structure may be implemented to further include circuits for processing (e.g., converting into an RF signal or converting an RF signal into a signal) the signals of the two or more frequency band groups and/or to have a physical structure (e.g., a length, area, or pattern) corresponding to the two or more frequency band groups.

According to various embodiments, some (e.g., the first port 443) of the plurality of ports 441, 443, and 445 of the RFFE device 400 may be connected with the third antenna 545, and the remaining some (e.g., the second port 441 and the third port 445) may not be connected. As described above with reference to FIGS. 4A and 4B, some (e.g., the first port 443) of the plurality of ports 441, 443, and 445 may be ports implemented to be connected with the third antenna 545 having the common structure. The first port 443 and the third antenna 545 may be associated with at least two or more same frequency band groups. For example, the first port 443 corresponding to at least two or more frequency band groups (e.g., high band and low band) (e.g., connected with the first circuit 411 implemented to process high-band signals and the second circuit 413 implemented to process low band signals) may be connected to the third antenna 545 to transmit and/or receive signals of the at least two or more frequency band groups (e.g., high band and low band).

According to various embodiments, the communication processor 510 may transmit and/or receive the signals of at least two or more frequency band groups through one antenna (e.g., the third antenna 545).

In an embodiment, when a communication event (e.g., an EN-DC event) occurs, the communication processor 510 may identify at least two or more frequency bands (e.g., high band and low band), as the operating frequency band, among the plurality of frequency band groups 311 and 312 for communication and control the RFIC 530 (e.g., the RFIC 320 of FIG. 3B) to convert the baseband signal into signals (e.g., the first signal S1 and the second signal S2) of the at least two or more specific function bands and transfer the converted signals through the RFFE device 400 to the antenna 300b (e.g., the third antenna 545) having the common structure corresponding to the at least two or more frequency bands (e.g., high band and low band). For example, the communication processor 510 may identify the first frequency band (e.g., B7 in Table 1) included in the high band and the second frequency band (e.g., B5 in Table 1) included in the low band, as the operating frequency band, and enable the RFIC 530 (e.g., the RFIC 320 of FIG. 3B) to convert the baseband signal to the first signal S1 of the identified first frequency band and the second signal S2 of the second frequency band and transfer the converted first signal S1 and second signal S2 from the RFIC 530 (e.g., the RFIC 320 of FIG. 3B) to the third antenna 545 corresponding to the first frequency band and second frequency band (e.g., high band and low band). In this case, to transfer the signals (e.g., the first signal and the second signal) output from the RFIC 530 (e.g., the RFIC 320 of FIG. 3B) to the specific antenna (e.g., the third antenna 545) and the RFFE device 400 for processing the signals of the selected frequency bands among the plurality of RFFE devices, the communication processor 510 may control (e.g., control to the closed state) the connection state of the switches associated with the components (e.g., the RFIC 530 (e.g., the RFIC 320 of FIG. 3B), the specific RFFE device 400, and the specific antenna) among the plurality of switches 420 so that the RFIC 530 (e.g., the RFIC 320 of FIG. 3B), the RFFE device 400, and the specific antenna (e.g., the third antenna 545) are connected. As part of the operation of controlling the state of the switch, the communication processor 510 may control the switch to transfer the first signal S1 output from the RFIC 530 (e.g., the RFIC 320 of FIG. 3B) to the circuit (e.g., the first circuit 411) for processing the signal of the first frequency band included in the RFFE device 400 and control the switch to transfer the second signal S2 to the circuit (e.g., the second circuit 413) for processing the signal of the second frequency band. Since the switch control operation of the communication processor 510 is a well-known technique, a detailed description thereof may not be repeated here. The first signal S1 may be processed (e.g., amplified or filtered) by the first circuit 411, and a processed first signal S1' may be output from the first circuit 411. The second signal S2 may be processed (e.g., amplified or filtered) by the second circuit 413, and a processed second signal S2' may be output from the second circuit 413. Based on the first switch 421 being controlled to the closed state, the processed first signal S1' may be applied to the first end 430a of the diplexer 430 through the first switch 421 and, based on the second switch 423 being controlled to the closed state, the processed second signal S2' may be applied to the second end 430b of the diplexer 430 through the second switch 423. By multiplexing the first signal S1' and the second signal S2' by the diplexer 430, a synthesized third signal S3 having the first frequency band and the second frequency band may be output from the third end 430c of the diplexer 430 and transferred through the first port 443 to the third antenna 545. Based on the third signal S3, the RF signal RFS may be output from the third antenna 545 to the base station.

In an embodiment, when the signals of the specific frequency bands (e.g., mid band and low band) are received through the third antenna 545, the communication processor 510 may identify the received signals through the RFFE device 400 and the RFIC 530 (e.g., the RFIC 320 of FIG. 3B). For example, when the RF signal having the specific frequency bands is received by the third antenna 545, a fourth signal S4 may be transferred from the third antenna 545 through the first port 433 to the third end 430c of the diplexer 430. By multiplexing the fourth signal S4 by the diplexer 430, a fifth signal S5 having the first frequency band may be output from the first end 430a of the diplexer 430, and a sixth signal S6 having the second frequency band may be output from the second end 430b of the diplexer 430. Based on the first switch 421 being controlled to the closed state, the fifth signal S5 may be transferred through the first switch 421 to the first circuit 411 and, based on the first switch 421 being controlled to the closed state, the sixth signal S6 may be transferred through the second switch 423 to the second circuit 413. The fifth signal S5 may be processed (e.g., amplified or filtered) by the first circuit 411, and a fifth signal S5' is generated and transferred to the RFIC 530. The sixth signal S6 is processed (e.g., amplified or filtered) by the second circuit 413, and a sixth signal S6' is generated and transferred to the RFIC 530. The communication processor 510 may obtain information corresponding to the fifth signal S5' and the sixth signal S6' using the RFIC 530.

According to various embodiments, the communication processor 510 may control the states of the plurality of switches 420 included in the RFFE device 400 to the closed state based on the switch control information pre-stored in the memory 520. The memory 520 may be implemented in the communication processor 510. When the electronic device 301 turns on, the communication processor 510 may control the states of the plurality of switches 420 included in the RFFE device 400 by referring to the switch control information stored in the memory 520. As the states of the plurality of switches 420 are controlled to the closed state, signal transmission and/or reception may be performed as described above.

According to various embodiments, the plurality of matching circuits 550 (or impedance tuning circuits) (e.g., the first matching circuit 551 and the second matching circuit 553) may be connected to ports (e.g., the second port 441 and the third port 445) that are not connected with an antenna. The plurality of matching circuits 550 may be disposed outside the RFFE device 400 and may be connected to the ports (e.g., the second port 441 and the third port 445) that are not connected with an antenna of the RFFE device 400. As another example, when the RFFE device 400 (or a chip set) is disposed on a substrate (or board) (e.g., a PCB and/or an FPCB), the matching circuits 550 may be provided adjacent to a portion of the substrate where the RFFE device 400 is disposed and may be connected to ports (e.g., the second port 441 and the third port 445) of the RFFE device 400. Each of the plurality of matching circuits 550 (e.g., the first matching circuit 551 and the second matching circuit 553) may include at least one inductor connected to have a specific inductance L and/or at least one capacitor connected to have a specific capacitance C, so as to have a specific time constant. One matching circuit may include a capacitor and an inductor to have an inductance and a capacitance (or a time constant) associated with one conductive circuit and a frequency band of a signal appliable to the one conductive circuit. For example, the capacitor and inductor included in the matching circuit may be connected in series or parallel to have an inductance and capacitance associated with the one conductive circuit and the frequency band of the signal appliable to the one conductive circuit.

Referring to FIGS. 6A, 6B and 6C, the parasitic component (e.g., the value of the imaginary part) of the impedance generated for the circuit including the first port 443 and each circuit (e.g., the first circuit 411 or the second circuit 413) by the conductive circuits connected to the ports (e.g., the second port 441 and the third port 445) not connected to an antenna may be reduced (or removed) by the plurality of matching circuits 550.

FIG. 6A illustrates graphs 611 and 621 showing the strength of signals obtained in the conventional RFFE device 330b connected with the antenna 300b having the common structure and Smith charts 613 and 623 for at least some electrical components of the RFFE device 330b, as a comparative example. The graphs 611 and 621 and the charts 613 and 623 may denote values measured with respect to the point (port (2)) corresponding to one end of the first circuit 331b, the point (port (3)) corresponding to one end of the second circuit 333b, and/or the point (port (1)) corresponding to the port 335b. For example, as illustrated in 610 of FIG. 6A, referring to the graph 611 indicating the signal strength in the frequency bands (e.g., 698 MHz to 2.2 GHZ) associated with the frequency band group (e.g., mid band) corresponding to the first circuit 331b, it may be observed that the signal strength between the point (port (2)) corresponding to one end of the first circuit 331b and the point (port (1)) corresponding to the port 335b is a first strength 611a and, at this time, impedance matching is properly performed referring to the Smith chart 613 (as compared with the example shown in FIG. 6B described below). As another example, as illustrated in 620 of FIG. 6A, referring to the graph 621 indicating the signal strength in the frequency bands (e.g., 2.3 GHz to 2.7 GHz) associated with the frequency band group (e.g., high band) corresponding to the second circuit 333b, it may be observed that the signal strength between the point (port (3)) corresponding to one end of the second circuit 333b and the point (port (1)) corresponding to the port 335b is a second strength 621a and, at this time, impedance matching is properly performed referring to the Smith chart 623 (as compared with the example shown in FIG. 6B described below).

FIG. 6B illustrates graphs 631 and 641 showing the strength of signals obtained when the matching circuits 550 are not connected to the RFFE device 400, according to various embodiments, connected with the antenna 300b having the common structure and Smith charts 632 and 642 for at least some electrical components of the RFFE device 330b, as a comparative example. The graphs 631 and 641 and the charts 632 and 642 may denote values measured with respect to the point (port (5)) corresponding to one end of the first circuit 441, the point (port (6)) corresponding to one end of the second circuit 413, and/or the point (port (4)) corresponding to the second port 443. For example, as illustrated in 630 of FIG. 6B, referring to the graph 631 indicating the signal strength in the frequency bands (e.g., 698 MHz to 2.2 GHZ) associated with the frequency band group (e.g., mid band) corresponding to the first circuit 411, the signal strength between the point (port (5)) corresponding to one end of the first circuit 411 and the point (port (4)) corresponding to the second port 443 may be a third strength 631a lower than the first strength 611a described above in connection with FIG. 6A. In other words, communication degradation may occur. Referring to the Smith chart 632, the occurrence of communication degradation may be based on failure in proper impedance matching as compared with FIG. 6A (or an occurrence of a parasitic component (e.g., the imaginary part of the impedance) due to the conductive circuit 451a). As another example, as illustrated in 640 of FIG. 6B, referring to the graph 641 indicating the signal strength in the frequency bands (e.g., 2.3 GHz to 2.7 GHZ) associated with the frequency band group (e.g., high band) corresponding to the second circuit 413, the signal strength between the point (port (6)) corresponding to one end of the second circuit 413 and the point (port (4)) corresponding to the second port 443 may be a fourth strength 641a lower than the second strength 621a described above in connection with FIG. 6A. In other words, communication degradation may occur. Referring to the Smith chart 642, the occurrence of communication degradation may be based on failure in proper impedance matching as compared with FIG. 6A (or an occurrence of a parasitic component (e.g., the imaginary part of the impedance) due to the conductive circuit 451b).

FIG. 6C illustrates graphs 651 and 661 showing the strength of signals obtained when the matching circuits 550 are connected to the RFFE device 400, according to various embodiments, connected with the antenna 300b having the common structure and Smith charts 652 and 662 for at least some electrical components of the RFFE device 330b, according to various embodiments. The graphs 651 and 661 and the charts 652 and 662 may denote values measured with respect to the point (port (8)) corresponding to one end of the first circuit 441, the point (port (9)) corresponding to one end of the second circuit 413, and/or the point (port (7)) corresponding to the second port 443. For example, as illustrated in 650 of FIG. 6C, referring to the graph 651 indicating the signal strength in the frequency bands (e.g., 698 MHz to 2.2 GHZ) associated with the frequency band group (e.g., mid band) corresponding to the first circuit 411, the signal strength between the point (port (8)) corresponding to one end of the first circuit 411 and the point (port (7)) corresponding to the second port 443 may correspond to the first strength 611a described in connection with FIG. 6A and may be a fifth strength 651a higher than the third strength 631a described above in connection with FIG. 6B. In other words, communication degradation may occur (or communication performance may be ensured). Referring to the Smith chart 652, a reduction in communication degradation may be based on proper impedance matching by the matching circuit 551 as compared with FIG. 6B (or removal of the parasitic component (e.g., the imaginary part of the impedance) due to the conductive circuit 451a). As another example, as illustrated in 660 of FIG. 6C, referring to the graph 661 indicating the signal strength in the frequency bands (e.g., 2.3 GHz to 2.7 GHZ) associated with the frequency band group (e.g., high band) corresponding to the second circuit 413, the signal strength between the point (port (9)) corresponding to one end of the second circuit 413 and the point (port (7)) corresponding to the second port 443 may correspond to the second strength 621a described above in connection with FIG. 6A and may be a sixth strength 661a higher than the fourth strength 641a described in connection with FIG. 6B. In other words, communication degradation may occur (or communication performance may be ensured). Referring to the Smith chart 662, a reduction in communication degradation may be based on proper imped- ance matching by the matching circuit 553 as compared with FIG. 6B (or removal of the parasitic component (e.g., the imaginary part of the impedance) due to the conductive circuit 451b).

An example of an operation of an electronic device 301 is described below according to various embodiments.

According to various embodiments, as described above, the electronic device 301 may include the RFFE device 400 connected with the antenna 300a having the separate structure and/or the RFFE device 400 connected with the antenna 300b having the common structure. When the electronic device 301 turns on, the communication processor 510 may control the states (e.g., the closed state or opened state) of the plurality of switches 420 included in the RFFE device 400 based on the switch control information stored in the memory 520. For example, the communication processor 510 may control the state of the plurality of switches 420 of the RFFE device 400 connected with the antenna 300a having the separation structure, to the opened state. As another example, the communication processor 510 may control the state of the plurality of switches 420 of the RFFE device 400 connected with the antenna 300b having the common structure, to the closed state.

Figure 7:
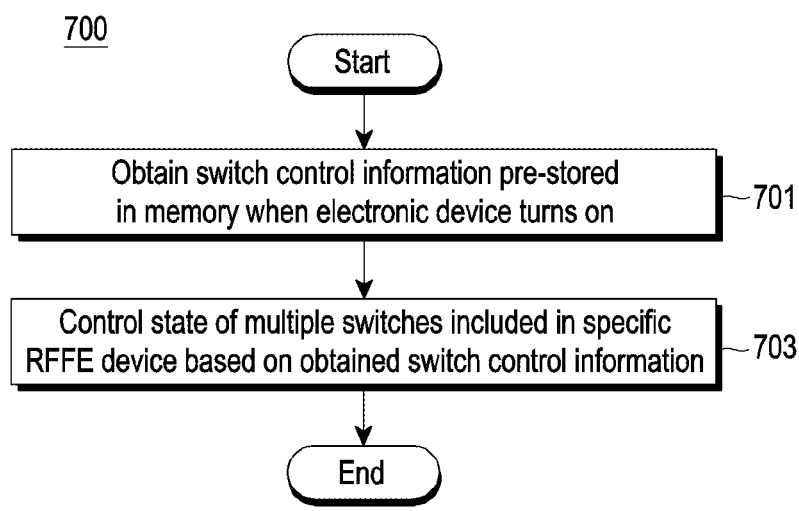
FIG. 7 is a flowchart illustrating an example operation of an electronic device according to various embodiments.

FIG. 7 is a flowchart 700 illustrating an example operation of an electronic device 301 according to various embodiments. The operations shown in FIG. 7 are not limited to the shown order but may rather be performed in other various orders. According to various embodiments, more or less operations than those of FIG. 7 may be performed. FIG. 7 is described below with reference to FIG. 8.

Figure 8:
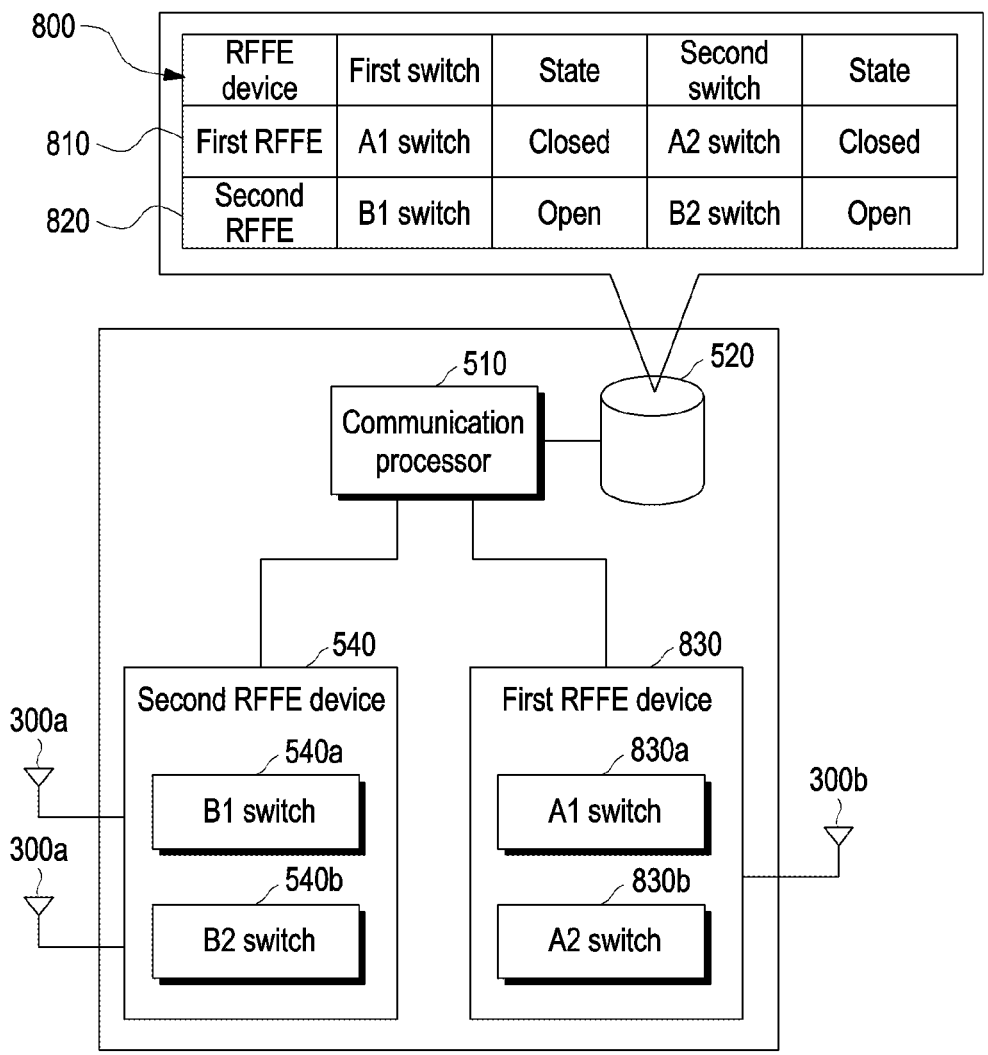
FIG. 8 is a diagram illustrating an example operation for changing states of switches (e.g., a first switch and a second switch) of an RFEF device of an electronic device according to various embodiments.

FIG. 8 is a diagram illustrating an example operation for changing states of switches (e.g., the first switch 421 and the second switch 423) of an RFEF device of an electronic device 301 according to various embodiments.

According to various embodiments, the electronic device 301 (e.g., the communication processor 510) may obtain switch control information pre-stored in the memory 520 when the electronic device 301 is turned on in operation 701. For example, referring to FIG. 8, the memory 520 included in the communication processor 510 may store the switch control information 800 including identification information for a plurality of switches (e.g., A1 and A2 switches 830a and 830b and B1 and B2 switches 540a and 540b) associated with the RFFE devices 830 and 540 and information 810 and 820 for the state to be controlled for each of the plurality of switches (e.g., A1 and A2 switches 830a and 830b and B1 and B2 switches 540a and 540b). The information 800 for the state to be controlled for each of the switches (e.g., A1 and A2 switches 830a and 830b and B1 and B2 switches 540a and 540b) may include an identifier for the state (e.g., the opened state or closed state) to be controlled for each of the switches (e.g., A1 and A2 switches 830a and 830b and B1 and B2 switches 540a and 540b). The switch control information 800 may be information pre-stored according to the type of a specific antenna (e.g., the antenna 300a having the separate structure or the antenna 300b having the common structure) after the RFFE device 400 is assembled (or coupled) to the specific antenna (e.g., 300a or 300b) in the electronic device 301 by the manufacturer. As an example, when the first RFFE device 830 is connected to the antenna 300b having the common structure, the memory 520 may store first switch control information 810 including identification information for the switches (e.g., A1 switch 830a and A2 switch 830b) included in the first RFFE device 830 and information indicating that the state to be controlled for each of the switches (e.g., A1 switch 830a and A2 switch 830b) is the closed state. As another example, when the second RFFE device 540 is connected to the antenna 300*a* having the common structure, the memory 520 may store second switch control information 820 including identification information for the switches (e.g., B1 switch 540*a* and B2 switch 540*b*) included in the second RFFE device 840 and information indicating that the state to be controlled for each of the switches (e.g., B1 switch 540*a* and B2 switch 540*b*) is the opened state.

According to various embodiments, the electronic device 301 (e.g., the communication processor 510) may control the state of the plurality of switches 420 included in the specific RFFE device 400 based on the obtained switch control information in operation 703. For example, the electronic device 301 (e.g., the communication processor 510) may control the plurality of switches (e.g., A1 and A2 switches 830*a* and 830*b* or B1 and B2 switches 540*a* and 540*b*) of the RFFE device (e.g., the first RFFE device 830 or the second RFFE device 540) corresponding to the obtained switch control information 810 or 820, to a specific state (e.g., the opened state or closed state). As part of the controlling operation, the electronic device 301 may transfer an electrical signal for controlling the state of the switch (e.g., A1 and A2 switches 830*a* and 830*b* and B1 and B2 switches 540*a* and 540*b*) to the specific state (e.g., the closed state or opened state) to the switches (e.g., A1 and A2 switches 830*a* and 830*b* and B1 and B2 switches 540*a* and 540*b*) of the RFFE device 400 (e.g., applies a positive current and/or voltage or a negative current and/or voltage to the gate of the switch (e.g., A1 and A2 switches 830*a* and 830*b* and B1 and B2 switches 540*a* and 540*b*)). The application of the electrical signal may be continuously maintained while the electronic device 301 is turned on. As an example, the electronic device 301 may control the state of the plurality of switches (e.g., A1 and A2 switches 830*a* and 830*b*) of the first RFFE device 830 corresponding to the first switch control information 810, to the closed state. Accordingly, a signal may be transmitted and/or received through the antenna 300*b* having the common structure as described above in connection with FIG. 5A. As another example, the electronic device 301 may control the state of the plurality of switches (e.g., B1 and B2 switches 540*a* and 540*b*) of the second RFFE device 540 corresponding to the second switch control information 820, to the opened state. Accordingly, a signal may be transmitted and/or received through the antenna 300*a* having the separate structure as described above in connection with FIG. 5B.

Meanwhile, according to various embodiments, the electronic device 301 may control the state of the plurality of switches 420 included in the specific RFFE device 400 based on meeting various types of conditions, as well as the turn-on of the electronic device 301. For example, meeting the conditions may include when a value associated with a characteristic of a signal of a specific frequency band corresponding to the specific RFFE device 400 (e.g., reference signal received power (RSRP), received strength signal indicator (RSSI), reference signal received quality (RSRQ), or signal to interference plus noise ratio (SINR)) is lowered to less than a preset value. When the value associated with the signal characteristic of the second frequency band is less than the preset value, the electronic device 301 may identify the switch control information corresponding to the RFFE device 400 corresponding to the second frequency band and control (or re-control) the state of the plurality of switches 420 of the RFFE device 400 based on the identified switch control information. As another example, meeting the designated conditions may include meeting a designated period. The electronic device 301 may periodically control the state of the plurality of switches 420 for each of the RFFE devices 400 according to the switch control information.

Meanwhile, in a case where the electronic device 301 turns off, as the application of the signal for controlling the state of the plurality of switches (e.g., A1 and A2 switches 830*a* and 830*b* or B1 and B2 switches 540*a* and 540*b*) of the RFFE device 400 is stopped, the state of the plurality of switches (e.g., A1 and A2 switches 830*a* and 830*b* or B1 and B2 switches 540*a* and 540*b*) may be changed to a state different from the state when the electronic device 301 turns on.

An example of an operation of an electronic device 301 is described below according to various embodiments. The above-described operations (e.g., the operations in FIG. 7) of the electronic device 301 according to various embodiments may be applied to the following description of the operation of the electronic device 301, and a duplicate description thereof may not be repeated.

According to various embodiments, when the electronic device 301 turns on, the communication processor 510 may control the state of the plurality of switches 420 of the RFFE device 400 connected to the antenna 300*a* having the separate structure, to the opened state and control the state of the plurality of switches 420 of the RFFE device 400 connected to the antenna 300*b* having the common structure, to the closed state.

Figure 9:
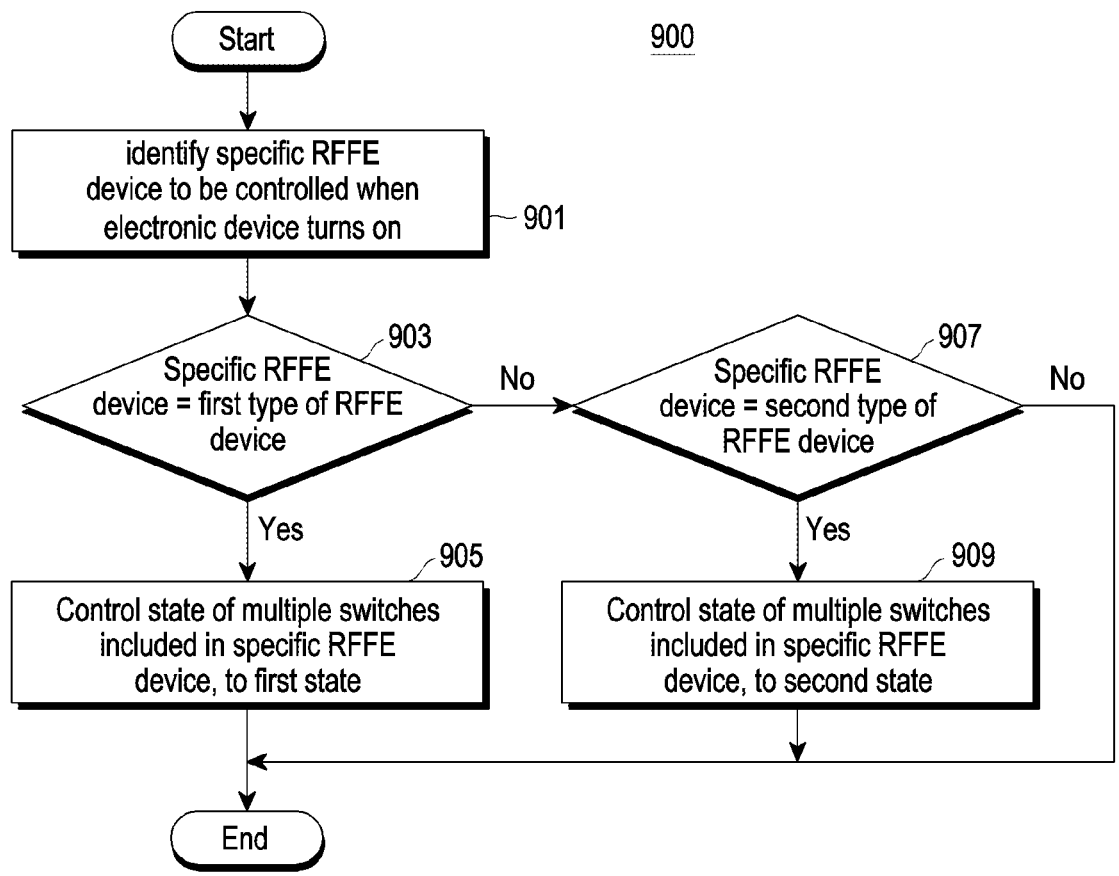
FIG. 9 is a flowchart illustrating an example operation of an electronic device according to various embodiments

FIG. 9 is a flowchart 900 illustrating an example of an operation of an electronic device 301 according to various embodiments. The operations shown in FIG. 9 are not limited to the shown order but may rather be performed in other various orders. According to various embodiments, more or less operations than those of FIG. 9 may be performed.

According to various embodiments, in operation 901, the electronic device 301 (e.g., the communication processor 510) may identify the RFFE device 400 to be controlled, when the electronic device 301 turns on.

According to various embodiments, in operation 903, the electronic device 301 (e.g., the communication processor 510) may determine whether the identified RFFE device 400 is the RFFE device 400 connected to a first type of antenna and, when the RFFE device 400 is the RFFE device 400 connected to the first type of antenna, control the state of the plurality of switches 420 of the RFFE device 400 to a first state in operation 905. According to various embodiments, in operation 907, the electronic device 301 (e.g., the communication processor 510) may determine whether the identified RFFE device 400 is the RFFE device 400 connected to a second type of antenna. According to various embodiments, in operation 909, when the RFFE device 400 is the RFFE device 400 connected to the second type of antenna, control the state of the plurality of switches 420 of the RFFE device 400 to a second state in operation 909. For example, the electronic device 301 (e.g., the communication processor 510) may control the state of the plurality of switches 420 of the RFFE device 400 to the opened state when the identified RFFE device 400 is connected to the antenna 300*a* having the separate structure and control the state of the plurality of switches 420 of the RFFE device 400 to the closed state when the RFFE device 400 is connected to the antenna 300*b* having the common structure.

According to various embodiments, there may be provided a radio frequency front end (RFFE) device (e.g., the RFFE device 400 of FIG. 4A) comprising a plurality of ports (e.g., the plurality of ports 440 of FIG. 4A) each connectable to an antenna, a first circuit (e.g., the first circuit 411 of FIG. 4A) configured to process a first signal for a first operating frequency band included in a first frequency band group, a second circuit (e.g., the second circuit 413 of FIG. 4A) configured to process a second signal for a second operating frequency band included in a second frequency band group, a diplexer 430 including a first end (e.g., the first end 430a of FIG. 4A) electrically connected with a first port (e.g., the first port 443 of FIG. 4A) of the plurality of ports (e.g., the plurality of ports 440 of FIG. 4A), a second end (e.g., the second end 430b of FIG. 4A), and a third end (e.g., the third end 430c of FIG. 4A), a first switch (e.g., the first switch 421 of FIG. 4A) connected to a first conductive line (e.g., the conductive line 450a of FIG. 4A) connecting between the first circuit (e.g., the first circuit 411 of FIG. 4A) and a second port (e.g., the second port 441 of FIG. 4A) of the plurality of ports (e.g., the plurality of ports 440 of FIG. 4A) and electrically connecting or electrically separating the second end (e.g., the second end 430b of FIG. 4A) of the diplexer 430 to/from the first circuit (e.g., the first circuit 411 of FIG. 4A) and the second port (e.g., the second port 441 of FIG. 4A) according to a state, and a second switch (e.g., the second switch 423 of FIG. 4A) connected to a second conductive line (e.g., the conductive line 450b of FIG. 4A) connecting between the second circuit (e.g., the second circuit 413 of FIG. 4A) and a third port (e.g., the third port 445 of FIG. 4A) of the plurality of ports (e.g., the plurality of ports 440 of FIG. 4A) and electrically connecting or electrically separating the third end (e.g., the third end 430c of FIG. 4A) of the diplexer 430 to/from the second circuit (e.g., the second circuit 413 of FIG. 4A) and the third port (e.g., the third port 445 of FIG. 4A) according to a state.

According to various embodiments, there may be provided the RFFE device 400, wherein the first circuit (e.g., the first circuit 411 of FIG. 4A) includes at least one first power amplifier (e.g., 411a of FIG. 4B) for processing the first signal for a first operating frequency band included in a first frequency band group and/or at least one first noise amplifier (e.g., at least some of 451a, 451b, 451c, and 451d of FIG. 4B), and a plurality of first filters (e.g., 411c and 411d of FIG. 4B), and the second circuit (e.g., the second circuit 413 of FIG. 4A) includes at least one second power amplifier (e.g., 413a of FIG. 4B) for processing the second signal for the first operating frequency band included in the first frequency band group and/or at least one second noise amplifier (e.g., at least some of 451a, 451b, 451c, and 451d of FIG. 4B), and a plurality of second filters (e.g., 413c and 413d of FIG. 4B).

According to various embodiments, there may be provided the RFFE device 400, wherein a signal is transferred through the first conductive line (e.g., the conductive line 450a of FIG. 4A) and the second conductive line (e.g., the conductive line 450b of FIG. 4A) or the first switch (e.g., the first switch 421 of FIG. 4A) and the second switch (e.g., the second switch 423 of FIG. 4A), according to the state of the first switch (e.g., the first switch 421 of FIG. 4A) and the state of the second switch (e.g., the second switch 423 of FIG. 4A).

According to various embodiments, there may be provided the RFFE device 400, wherein when the state of the first switch (e.g., the first switch 421 of FIG. 4A) and the state of the second switch (e.g., the second switch 423 of FIG. 4A) are a closed state, the second end (e.g., the second end 430b of FIG. 4A) of the diplexer 430 is electrically connected to the first circuit (e.g., the first circuit 411 of FIG. 4A) and the second port (e.g., the second port 441 of FIG. 4A), and the third end (e.g., the third end 430c of FIG. 4A) of the diplexer 430 is electrically connected to the second circuit (e.g., the second circuit 413 of FIG. 4A) and the third port (e.g., the third port 445 of FIG. 4A).

According to various embodiments, there may be provided the RFFE device 400, wherein while the state of the first switch (e.g., the first switch 421 of FIG. 4A) and the state of the second switch (e.g., the second switch 423 of FIG. 4A) are the closed state, if a third signal for the first operating frequency band is output from the first circuit (e.g., the first circuit 411 of FIG. 4A), and a fourth signal for the second operating frequency band is output from the second circuit (e.g., the second circuit 413 of FIG. 4A), the third signal is transferred to the second end (e.g., the second end 430b of FIG. 4A) of the diplexer 430 through the first switch (e.g., the first switch 421 of FIG. 4A), and the fourth signal is transferred to the third end (e.g., the third end 430c of FIG. 4A) of the diplexer 430 through the second switch (e.g., the second switch 423 of FIG. 4A).

According to various embodiments, there may be provided the RFFE device 400, wherein a fifth signal for the first operating frequency band and the second operating frequency band is output from the first end (e.g., the first end 430a of FIG. 4A) of the diplexer 430, based on the third signal and the fourth signal, and the fifth signal is transferred to the first port (e.g., the first port 443 of FIG. 4A).

According to various embodiments, there may be provided the RFFE device 400, wherein while the state of the first switch (e.g., the first switch 421 of FIG. 4A) and the state of the second switch (e.g., the second switch 423 of FIG. 4A) are the closed state, if a sixth signal for the first operating frequency band and the second operating frequency band is transferred to the third end (e.g., the third end 430c of FIG. 4A) of the diplexer 430 through the first port (e.g., the first port 443 of FIG. 4A), a seventh signal for the first operating frequency band is transferred to the first circuit (e.g., the first circuit 411 of FIG. 4A) through the first switch (e.g., the first switch 421 of FIG. 4A) from the first end (e.g., the first end 430a of FIG. 4A) of the diplexer 430, and an eighth signal for the second operating frequency band is transferred to the second circuit (e.g., the second circuit 413 of FIG. 4A) through the second switch (e.g., the second switch 423 of FIG. 4A) from the second end (e.g., the second end 430b of FIG. 4A) of the diplexer 430.

According to various embodiments, there may be provided the RFFE device 400, wherein when the state of the first switch (e.g., the first switch 421 of FIG. 4A) and the state of the second switch (e.g., the second switch 423 of FIG. 4A) are an opened state, the second end (e.g., the second end 430b of FIG. 4A) of the diplexer 430 is electrically separated from the first circuit (e.g., the first circuit 411 of FIG. 4A) and the second port (e.g., the second port 441 of FIG. 4A), and the third end (e.g., the third end 430c of FIG. 4A) of the diplexer 430 is electrically separated from the second circuit (e.g., the second circuit 413 of FIG. 4A) and the third port (e.g., the third port 445 of FIG. 4A).

According to various embodiments, there may be provided the RFFE device 400, wherein while the state of the first switch (e.g., the first switch 421 of FIG. 4A) and the state of the second switch (e.g., the second switch 423 of FIG. 4A) are the opened state, if a third signal for the first operating frequency band is output from the first circuit (e.g., the first circuit 411 of FIG. 4A), and/or a fourth signal for the second operating frequency band is output from the second circuit (e.g., the second circuit 413 of FIG. 4A), the third signal is transferred to the second port (e.g., the second port 441 of FIG. 4A) through the first conductive line (e.g., the conductive line 450a of FIG. 4A) and/or the fourth signal is transferred to the third port (e.g., the third port 445 of FIG. 4A) through the second conductive line (e.g., the conductive line 450b of FIG. 4A).

According to various embodiments, there may be provided the RFFE device 400, wherein while the state of the first switch (e.g., the first switch 421 of FIG. 4A) and the state of the second switch (e.g., the second switch 423 of FIG. 4A) are the opened state, a fifth signal for the first operating frequency band is transferred to the first circuit (e.g., the first circuit 411 of FIG. 4A) through the first conductive line (e.g., the conductive line 450a of FIG. 4A) from the second port (e.g., the second port 441 of FIG. 4A), and a sixth signal for the second operating frequency band is transferred to the second circuit (e.g., the second circuit 413 of FIG. 4A) from the third port (e.g., the third port 445 of FIG. 4A).

According to various embodiments, there may be provided an electronic device 301 comprising a first antenna (e.g., the third antenna 545 of FIG. 5B) for transmitting and/or receiving a signal for a first operating frequency band and a second operating frequency band, an RFFE device 400 including a first port (e.g., the first port 443 of FIG. 4A) connected to the first antenna (e.g., the third antenna 545 of FIG. 5B), a second port (e.g., the second port 441 of FIG. 4A), a third port (e.g., the third port 445 of FIG. 4A), a first circuit (e.g., the first circuit 411 of FIG. 4A) configured to process a first signal for the first operating frequency band, a second circuit (e.g., the second circuit 413 of FIG. 4A) configured to process a second signal for the second operating frequency band, a diplexer 430 including a first end (e.g., the first end 430a of FIG. 4A) electrically connected with the first port (e.g., the first port 443 of FIG. 4A), a second end (e.g., the second end 430b of FIG. 4A), and a third end (e.g., the third end 430c of FIG. 4A), a first switch (e.g., the first switch 421 of FIG. 4A) connected to a first conductive line (e.g., the conductive line 450a of FIG. 4A) connecting between the first circuit (e.g., the first circuit 411 of FIG. 4A) and the second port (e.g., the second port 441 of FIG. 4A) and electrically connecting or electrically separating the second end (e.g., the second end 430b of FIG. 4A) of the diplexer 430 to/from the first circuit (e.g., the first circuit 411 of FIG. 4A) and the second port (e.g., the second port 441 of FIG. 4A) according to a state, and a second switch (e.g., the second switch 423 of FIG. 4A) connected to a second conductive line (e.g., the conductive line 450b of FIG. 4A) connecting between the second circuit (e.g., the second circuit 413 of FIG. 4A) and the third port (e.g., the third port 445 of FIG. 4A) and electrically connecting or electrically separating the third end (e.g., the third end 430c of FIG. 4A) of the diplexer 430 to/from the second circuit (e.g., the second circuit 413 of FIG. 4A) and the third port (e.g., the third port 445 of FIG. 4A) according to a state, a first matching circuit 551 connected to the second port (e.g., the second port 441 of FIG. 4A), and a second matching circuit 553 connected to the third port (e.g., the third port 445 of FIG. 4A).

According to various embodiments, there may be provided the electronic device 301, wherein the first matching circuit 551 includes at least one of at least one capacitor or at least one inductor corresponding to a first time constant associated with an impedance of the first conductive line (e.g., the conductive line 450a of FIG. 4A), and the second matching circuit 553 includes at least one of at least one capacitor or at least one inductor corresponding to a second time constant associated with an impedance of the second conductive line (e.g., the conductive line 450b of FIG. 4A).

According to various embodiments, there may be provided the electronic device 301 further comprising a communication processor 510, wherein the communication processor 510 is configured to control the states of the first switch (e.g., the first switch 421 of FIG. 4A) and the second switch (e.g., the second switch 423 of FIG. 4A) to a closed state when the electronic device 301 turns on.

According to various embodiments, there may be provided the electronic device 301, wherein when the state of the first switch (e.g., the first switch 421 of FIG. 4A) and the state of the second switch (e.g., the second switch 423 of FIG. 4A) are the closed state, the second end (e.g., the second end 430b of FIG. 4A) of the diplexer 430 is electrically connected to the first circuit (e.g., the first circuit 411 of FIG. 4A) and the second port (e.g., the second port 441 of FIG. 4A), and the third end (e.g., the third end 430c of FIG. 4A) of the diplexer 430 is electrically connected to the second circuit (e.g., the second circuit 413 of FIG. 4A) and the third port (e.g., the third port 445 of FIG. 4A).

According to various embodiments, there may be provided the electronic device 301 further comprising an RFIC 530 (e.g., the RFIC 320 of FIG. 3B), wherein the communication processor 510 is configured to control the RFIC 530 (e.g., the RFIC 320 of FIG. 3B) to transfer a third signal for the first operating frequency band to the first circuit (e.g., the first circuit 411 of FIG. 4A) and transfer a fourth signal for the second operating frequency band to the second circuit (e.g., the second circuit 413 of FIG. 4A) while the state of the first switch (e.g., the first switch 421 of FIG. 4A) and the state of the second switch (e.g., the second switch 423 of FIG. 4A) are the closed state, wherein a fifth signal is output from the first circuit (e.g., the first circuit 411 of FIG. 4A) based on the third signal and is transferred through the first switch (e.g., the first switch 421 of FIG. 4A) to the second end (e.g., the second end 430b of FIG. 4A) of the diplexer 430, wherein a sixth signal is output from the second circuit (e.g., the second circuit 413 of FIG. 4A) based on the fourth signal and is transferred through the second switch (e.g., the second switch 423 of FIG. 4A) to the third end (e.g., the third end 430c of FIG. 4A) of the diplexer 430, and wherein a seventh signal for the first operating frequency band and the second operating frequency band, output from the first end (e.g., the first end 430a of FIG. 4A) of the diplexer 430, based on the fifth signal and the sixth signal, is transferred to the first antenna (e.g., the third antenna 545 of FIG. 5B) through the first port (e.g., the first port 443 of FIG. 4A).

According to various embodiments, there may be provided the electronic device 301 further comprising an RFIC 530 (e.g., the RFIC 320 of FIG. 3B), wherein the communication processor 510 is configured to obtain a signal received through the first antenna (e.g., the third antenna 545 of FIG. 5B) using the RFFE device 400 and the RFIC 530 (e.g., the RFIC 320 of FIG. 3B) while the state of the first switch (e.g., the first switch 421 of FIG. 4A) and the state of the second switch (e.g., the second switch 423 of FIG. 4A) are the closed state, wherein based on a third signal for the first operating frequency band and the second operating frequency band being transferred to the third end (e.g., the third end 430c of FIG. 4A) of the diplexer 430 through the first port (e.g., the first port 443 of FIG. 4A) from the first antenna (e.g., the third antenna 545 of FIG. 5B), a fourth signal for the first operating frequency band is output from the first end (e.g., the first end 430a of FIG. 4A) of the diplexer 430 and transferred to the first circuit (e.g., the first circuit 411 of FIG. 4A) through the first switch (e.g., the first switch 421 of FIG. 4A), and a fifth signal for the second operating frequency band is transferred to the second circuit (e.g., the second circuit 413 of FIG. 4A) through the second switch (e.g., the second switch 423 of FIG. 4A) from the second end (e.g., the second end 430b of FIG. 4A) of the diplexer 430, wherein a sixth signal based on the fourth signal is transferred from the first circuit (e.g., the first circuit 411 of FIG. 4A) to the RFIC 530 (e.g., the RFIC 320 of FIG. 3B), and a seventh signal based on the fifth signal is transferred from the second circuit (e.g., the second circuit 413 of FIG. 4A) to the RFIC 530 (e.g., the RFIC 320 of FIG. 3B), and wherein the signal is obtained based on the sixth signal and the seventh signal.

According to various embodiments, there may be provided an electronic device 301 comprising a first antenna (e.g., the first antenna 541 of FIG. 5A) for transmitting and/or receiving a first signal having a first operating frequency band included in a first frequency band group, a second antenna (e.g., the second antenna 543 of FIG. 5A) for transmitting and/or receiving a second signal having a second operating frequency band included in a second frequency band group, and an RFFE device 400 including a first port (e.g., the first port 443 of FIG. 4A), a second port (e.g., the second port 441 of FIG. 4A) connected with the first antenna (e.g., the first antenna 541 of FIG. 5A), a third port (e.g., the third port 445 of FIG. 4A) connected with the second antenna (e.g., the second antenna 543 of FIG. 5A), a first circuit (e.g., the first circuit 411 of FIG. 4A) associated with the first signal, a second circuit (e.g., the second circuit 413 of FIG. 4A) associated with the second signal, a diplexer 430 including a first end (e.g., the first end 430a of FIG. 4A) electrically connected with the first port (e.g., the first port 443 of FIG. 4A), a second end (e.g., the second end 430b of FIG. 4A), and a third end (e.g., the third end 430c of FIG. 4A), a first switch (e.g., the first switch 421 of FIG. 4A) connected to a first conductive line (e.g., the conductive line 450a of FIG. 4A) connecting between the first circuit (e.g., the first circuit 411 of FIG. 4A) and the second port (e.g., the second port 441 of FIG. 4A) and electrically connecting or electrically separating the second end (e.g., the second end 430b of FIG. 4A) of the diplexer 430 to/from the first circuit (e.g., the first circuit 411 of FIG. 4A) and the second port (e.g., the second port 441 of FIG. 4A) according to a state, and a second switch (e.g., the second switch 423 of FIG. 4A) connected to a second conductive line (e.g., the conductive line 450b of FIG. 4A) connecting between the second circuit (e.g., the second circuit 413 of FIG. 4A) and the third port (e.g., the third port 445 of FIG. 4A) and electrically connecting or electrically separating the third end (e.g., the third end 430c of FIG. 4A) of the diplexer 430 to/from the second circuit (e.g., the second circuit 413 of FIG. 4A) and the third port (e.g., the third port 445 of FIG. 4A) according to a state.

According to various embodiments, there may be provided the electronic device 301 further comprising a communication processor 510, wherein the communication processor 510 is configured to, when the electronic device 301 turns on, control the states of the first switch (e.g., the first switch 421 of FIG. 4A) and the second switch (e.g., the second switch 423 of FIG. 4A) to an opened state, and the second end (e.g., the second end 430b of FIG. 4A) of the diplexer 430 is electrically separated from the first circuit (e.g., the first circuit 411 of FIG. 4A) and the second port (e.g., the second port 441 of FIG. 4A), and the third end (e.g., the third end 430c of FIG. 4A) of the diplexer 430 is electrically separated from the second circuit (e.g., the second circuit 413 of FIG. 4A) and the third port (e.g., the third port 445 of FIG. 4A).

According to various embodiments, there may be provided the electronic device 301 further comprising an RFIC 530 (e.g., the RFIC 320 of FIG. 3B), wherein the communication processor 510 is configured to control the RFIC 530 (e.g., the RFIC 320 of FIG. 3B) to transfer a third signal for the first operating frequency band to the first circuit (e.g., the first circuit 411 of FIG. 4A) and/or transfer a fourth signal for the first operating frequency band to the second circuit (e.g., the second circuit 413 of FIG. 4A) while the state of the first switch (e.g., the first switch 421 of FIG. 4A) and the state of the second switch (e.g., the second switch 423 of FIG. 4A) are the closed state, and wherein while the state of the first switch (e.g., the first switch 421 of FIG. 4A) and the state of the second switch (e.g., the second switch 423 of FIG. 4A) are the opened state, a fifth signal, output from the first circuit (e.g., the first circuit 411 of FIG. 4A) based on the third signal, is transferred to the second port (e.g., the second port 441 of FIG. 4A) through the first conductive line (e.g., the conductive line 450a of FIG. 4A), and/or a sixth signal, output from the second circuit (e.g., the second circuit 413 of FIG. 4A) based on the fourth signal, is transferred to the third port (e.g., the third port 445 of FIG. 4A) through the second conductive line (e.g., the conductive line 450b of FIG. 4A).

According to various embodiments, there may be provided the electronic device 301 further comprising an RFIC 530 (e.g., the RFIC 320 of FIG. 3B), wherein the communication processor 510 is configured to obtain a third signal for the first operating frequency band and/or a fourth signal for the second operating frequency band using the RFFE device 400 and the RFIC 530 (e.g., the RFIC 320 of FIG. 3B) while the state of the first switch (e.g., the first switch 421 of FIG. 4A) and the state of the second switch (e.g., the second switch 423 of FIG. 4A) are the closed state, and wherein while the state of the first switch (e.g., the first switch 421 of FIG. 4A) and the state of the second switch (e.g., the second switch 423 of FIG. 4A) are the opened state, a fifth signal received through the second port (e.g., the second port 441 of FIG. 4A) is transferred to the first circuit (e.g., the first circuit 411 of FIG. 4A) so that the third signal is transferred from the first circuit (e.g., the first circuit 411 of FIG. 4A) to the RFIC 530 (e.g., the RFIC 320 of FIG. 3B), and/or the sixth signal received through the third port (e.g., the third port 445 of FIG. 4A) is transferred to the second circuit (e.g., the second circuit 413 of FIG. 4A) so that the fourth signal is transferred from the second circuit (e.g., the second circuit 413 of FIG. 4A) to the RFIC 530 (e.g., the RFIC 320 of FIG. 3B).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A radio frequency front end (RFFE) device comprising:
a plurality of ports each connectable to an antenna;
a first circuit configured to process a first signal for a first operating frequency band included in a first frequency band group;
a second circuit configured to process a second signal for a second operating frequency band included in a second frequency band group;

a diplexer including a first end electrically connected with a first port of the plurality of ports, a second end, and a third end;

a first conductive line connecting the first circuit and a second port of the plurality of ports;

a second conductive line connecting the second circuit and a third port of the plurality of ports;

a first switch; connected between the first conductive line and the second end of the diplexer, the first switch being configured to electrically connect or electrically separate the second end of the diplexer to/from the first circuit and the second port based on a first state of the first switch; and a second switch; connected between the second conductive line and the third end of the diplexer, the second switch being configured to electrically connect or electrically separate the third end of the diplexer to/from the second circuit and the third port based on a state of the second switch.

2. The RFFE device of claim 1, wherein the first circuit includes at least one first power amplifier configured to process the first signal for the first operating frequency band included in the first frequency band group and/or at least one first noise amplifier, and a plurality of first filters, and wherein the second circuit includes at least one second power amplifier configured to process the second signal for the second operating frequency band included in the second frequency band group and/or at least one second noise amplifier, and a plurality of second filters.

3. The RFFE device of claim 1, wherein the RFFE device is configured to transfer a signal through the first conductive line and the second conductive line or the first switch and the second switch, based on the state of the first switch and the state of the second switch.

4. The RFFE device of claim 3, wherein, based on the state of the first switch and the state of the second switch being a closed state, the second end of the diplexer is electrically connected to the first circuit and the second port, and the third end of the diplexer is electrically connected to the second circuit and the third port.

5. The RFFE device of claim 4, wherein, while the state of the first switch and the state of the second switch are the closed state, the RFFE device is configured to, based on a third signal for the first operating frequency band being output from the first circuit, and a fourth signal for the second operating frequency band being output from the second circuit, transfer the third signal to the second end of the diplexer through the first switch, and transfer the fourth signal to the third end of the diplexer through the second switch.

6. The RFFE device of claim 5, wherein a fifth signal for the first operating frequency band and the second operating frequency band is output from the first end of the diplexer, based on the third signal and the fourth signal, and the fifth signal is transferred to the first port.

7. The RFFE device of claim 4, wherein, while the state of the first switch and the state of the second switch are the closed state, the RFFE device is configured to, based on a sixth signal for the first operating frequency band and the second operating frequency band being transferred to the third end of the diplexer through the first port, transfer a seventh signal for the first operating frequency band to the first circuit through the first switch from the first end of the diplexer, and to transfer an eighth signal for the second operating frequency band to the second circuit through the second switch from the second end of the diplexer.

8. The RFFE device of claim 3, wherein, based on the state of the first switch and the state of the second switch being an opened state, the second end of the diplexer is electrically separated from the first circuit and the second port, and the third end of the diplexer is electrically separated from the second circuit and the third port.

9. The RFFE device of claim 8, wherein, while the state of the first switch and the state of the second switch are the opened state, based on a third signal for the first operating frequency band being output from the first circuit, and/or a fourth signal for the second operating frequency band being output from the second circuit, the RFFE device is configured to transfer the third signal to the second port through the first conductive line and/or to transfer the fourth signal to the third port through the second conductive line.

10. The RFFE device of claim 8, wherein, while the state of the first switch and the state of the second switch are the opened state, the RFFE device is configured to transfer a fifth signal for the first operating frequency band to the first circuit through the first conductive line from the second port, and transfer a sixth signal for the second operating frequency band to the second circuit from the third port.

11. An electronic device comprising:

a first antenna for transmitting and/or receiving a signal for a first operating frequency band and a second operating frequency band;

a radio frequency front end (RFFE) device including:

a plurality of ports including a first port connected to the first antenna, a second port, and a third port, a first circuit configured to process a first signal for the first operating frequency band, a second circuit configured to process a second signal for the second operating frequency band, a diplexer including a first end electrically connected with the first port, a second end, and a third end, a first conductive line connecting the first circuit and the second port of the plurality of ports;

a second conductive line connecting the second circuit and the third port of the plurality of ports;

a first switch, connected between the first conductive line and the second end of the diplexer, the first switch being configured to electrically connect or electrically separate the second end of the diplexer to/from the first circuit and the second port based on a state of the first switch, and a second switch, connected between the second conductive line and the third end of the diplexer, the second switch being configured to electrically connect or electrically separate the third end of the diplexer to/from the second circuit and the third port based on a state of the second switch, a first matching circuit connected to the second port; and a second matching circuit connected to the third port.

12. The electronic device of claim 11, wherein the first matching circuit includes at least one of at least one capacitor or at least one inductor corresponding to a first time constant associated with an impedance of the first conductive line, and wherein the second matching circuit includes at least one of at least one capacitor or at least one inductor corresponding to a second time constant associated with an impedance of the second conductive line.

13. The electronic device of claim 11, further comprising a communication processor comprising communication processing circuitry, wherein the communication processor is configured to control the state of the first switch and the state of the second switch to a closed state based on the electronic device being turned on.

14. The electronic device of claim 13, wherein, based on the state of the first switch and the state of the second switch being the closed state, the second end of the diplexer is electrically connected to the first circuit and the second port, and the third end of the diplexer is electrically connected to the second circuit and the third port.

15. The electronic device of claim 14, further comprising a radio frequency integrated circuit (RFIC;,
wherein the communication processor is configured to control the RFIC to transfer a third signal for the first operating frequency band to the first circuit and transfer a fourth signal for the second operating frequency band to the second circuit while the state of the first switch and the state of the second switch are the closed state,
wherein a fifth signal is output from the first circuit based on the third signal and is configured to be transferred through the first switch to the second end of the diplexer,
wherein a sixth signal is output from the second circuit based on the fourth signal and is configured to be transferred through the second switch to the third end of the diplexer, and
wherein a seventh signal for the first operating frequency band and the second operating frequency band, output from the first end of the diplexer, based on the fifth signal and the sixth signal, is configured to be transferred to the first antenna through the first port.

16. The electronic device of claim 14, further comprising an RFIC,
wherein the communication processor is configured to obtain a signal received through the first antenna using the RFFE device and the RFIC while the state of the first switch and the state of the second switch are the closed state,
wherein, based on a third signal for the first operating frequency band and the second operating frequency band being transferred to the third end of the diplexer through the first port from the first antenna, a fourth signal for the first operating frequency band is configured to be output from the first end of the diplexer and transferred to the first circuit through the first switch, and a fifth signal for the second operating frequency band is configured to be transferred to the second circuit through the second switch from the second end of the diplexer,
wherein a sixth signal based on the fourth signal is configured to be transferred from the first circuit to the RFIC, and a seventh signal based on the fifth signal is configured to be transferred from the second circuit to the RFIC, and
wherein the signal is obtained based on the sixth signal and the seventh signal.

17. An electronic device comprising:
a first antenna for transmitting and/or receiving a first signal having a first operating frequency band included in a first frequency band group;
a second antenna for transmitting and/or receiving a second signal having a second operating frequency band included in a second frequency band group; and an RFFE device including a first port, a second port connected with the first antenna, a third port connected with the second antenna; a first circuit associated with the first signal; a second circuit associated with the second signal; a diplexer including a first end electrically connected with the first port, a second end, and a third end; a first conductive line connecting the first circuit and the second port; a second conductive line connecting the second circuit and the third port; a first switch connected between the first conductive line and the second end of the diplexer, the first switch being configured to electrically connect or electrically separate the second end of the diplexer to/from the first circuit and the second port based on a state of the first switch; and a second switch connected between the second conductive line and the third end of the diplexer, the second switch being configured to electrically connect or electrically separate the third end of the diplexer to/from the second circuit and the third port based on a state of the second switch.

18. The electronic device of claim 17, further comprising a communication processor comprising communication processing circuitry,
wherein the communication processor is configured to, when the electronic device turns on, control states of the first switch and the second switch to an opened state, and the second end of the diplexer is electrically separated from the first circuit and the second port, and the third end of the diplexer is electrically separated from the second circuit and the third port.

19. The electronic device of claim 18, further comprising an RFIC,
wherein the communication processor is configured to control the RFIC to transfer a third signal for the first operating frequency band to the first circuit and/or transfer a fourth signal for the first operating frequency band to the second circuit while the state of the first switch and the state of the second switch are a closed state, and
wherein, while the state of the first switch and the state of the second switch are the opened state, a fifth signal, output from the first circuit based on the third signal, is transferred to the second port through the first conductive line, and/or a sixth signal, output from the second circuit based on the fourth signal, is transferred to the third port through the second conductive line.

20. The electronic device of claim 18, further comprising an RFIC,
wherein the communication processor is configured to obtain a third signal for the first operating frequency band and/or a fourth signal for the second operating frequency band using the RFFE device and the RFIC while the first state of the first switch and the second state of the second switch are a closed state, and
wherein while the state of the first switch and the state of the second switch are the opened state, a fifth signal received through the second port is transferred to the first circuit so that the third signal is transferred from the first circuit to the RFIC, and/or a sixth signal received through the third port is transferred to the second circuit so that the fourth signal is transferred from the second circuit to the RFIC.

* * * * *